(12) United States Patent
Yamada

(10) Patent No.: US 7,684,089 B2
(45) Date of Patent: Mar. 23, 2010

(54) PRINTER AND PRINTING METHOD

(75) Inventor: Hiromichi Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 894 days.

(21) Appl. No.: 11/447,434

(22) Filed: Jun. 6, 2006

(65) Prior Publication Data
US 2006/0274939 A1 Dec. 7, 2006

(30) Foreign Application Priority Data
Jun. 7, 2005 (JP) ............................... 2005-167406
Mar. 31, 2006 (JP) ............................... 2006-099817

(51) Int. Cl.
*H04N 1/40* (2006.01)
(52) U.S. Cl. .................... 358/3.28; 358/468
(58) Field of Classification Search .................. 358/1.9, 358/2.1, 3.28, 436, 468
See application file for complete search history.

(56) References Cited

U.S. PATENT DOCUMENTS 7,002,709 B1 * 2/2006 Terada et al. ............... 358/3.28
7,168,868 B2 * 1/2007 Uchida et al. ............... 400/62

FOREIGN PATENT DOCUMENTS

| JP | 7-231384 A | 8/1995 |
|---|---|---|
| JP | 2001-197297 A | 7/2001 |
| JP | 2001-346032 A | 12/2001 |
| JP | 2003-72166 A | 3/2003 |

* cited by examiner

*Primary Examiner*—Thomas D Lee
*Assistant Examiner*—Stephen M Brinich
(74) *Attorney, Agent, or Firm*—Canon USA Inc IP Division

(57) ABSTRACT

A copy-forgery-inhibited (CFI) pattern image is effectively printed irrespective of difference in information of (CFI) pattern setting between a host unit and a printing apparatus in relation to printing of a (CFI) pattern image. A (CFI) pattern image, for example, "COPY INHIBIT" is set on the printer side while a (CFI) pattern image "COPY" is set under a printing instruction delivered from a host PC. If determination is resulted in inconsistency between strings, indication for asking the user which (CFI) pattern image is given preference to be displayed on an UI screen of the printer. Further, similar indication is displayed on the host PC side. Thus, it is possible to render the user to determine whether the setting of a (CFI) pattern image on the host PC side is given preference to or the setting on the printer side is given preference to.

3 Claims, 30 Drawing Sheets

FIG. 10

| | |
|---|---|
| OBJECT KIND TO BE DRAWN BY COPY-FORGERY-INHIBITED PATTERN PRINTING | 2001 |
| INPUT FILE NAME (AT THE TIME OF IMAGE SELECTION) FONT INFORMATION (AT THE TIME OF TEXT SELECTION) | 2002 |
| PRINTING ORDER OF COPY-FORGERY-INHIBITED PATTERN (WATERMARK, OVERWRITE) | 2003 |
| ANGLE INFORMATION OF DRAWING OBJECT | 2004 |
| COLOR INFORMATION OF COPY-FORGERY-INHIBITED PATTERN IMAGE | 2005 |
| INFORMATION AS TO WHETHER REPLACEMENT BETWEEN FOREGROUND PATTERN AND BACKGROUND PATTERN IS MADE OR NOT | 2006 |
| PATTERN ADDITIONAL INFORMATION OF CAMOUFLAGE IMAGE | 2007 |
| DENSITY INFORMATION OF BACKGROUND PATTERN | 2008 |
| DENSITY INFORMATION OF BACKGROUND PATTERN | 2009 |
| ATTRIBUTE INFORMATION OF ADDITIONAL COPY-FORGERY-INHIBITED PATTERN PRINTING | 2010 |

IMAGE AFTER COPY-FORGERY-INHIBITED PATTERN PRINTING

EMBOSSMENT

REVERSE

FIG. 21

| PDL PRINTING | TRANSMISSION | COPY |

STYLE NAME "COPY INHIBIT" IS
SET AT PRESENT IN THIS PRINTER.
IS STYLE NAME "COPY" OF NOW RECEIVED
COPY- FORGERY- INHIBITED PATTERN
DOCUMENT GIVEN PREFERENCE TO?

| YES | NO |

PRINTER AND PRINTING METHOD

BACKGROUND OF THE INVENTION

1. Field of the Invention

The present invention relates to a printer and a printing method, and in particular to a printer and a printing method thereof capable of printing a copy-forgery-inhibiting pattern image having a function of constraining duplication or use of a duplicated matter, together with an image to be constrained from the duplication.

2. Description of the Related Art

Heretofore, for the purpose of inhibiting or constraining duplication of a ledger sheet, a resident card or the like, contents thereof have been printed on a sheet applied with special printing, that is, the so-called forgery preventing sheet. The forgery preventing sheet is a sheet for a master copy of which is hard to see for mankind, however a sheet that can emboss characters such as "COPY INHIBIT" in case of duplicating with the use of a copying machine. This produces such an effect that causes a person to hesitate to use a duplicated matter thereof. Further, the form or the like printed on the forgery preventing sheet exhibits such an effect that duplication may be prevented or controlled. However, the above-mentioned forgery preventing sheet causes a problem of expensive costs in comparison with sheets usually used. Further, only characters which are set during the manufacture of the forgery preventing sheet becomes visible, and accordingly, the forgery preventing sheet is limited in use, that is, it is not flexible in its use.

On the contrary, in Japanese Patent Laid-Open Publication No. 2001-197297, it is disclosed that image data called to be a copy-forgery-inhibited pattern is generated in addition to printing data, and these data are printed being superposed with each other by a printer. The printed image including the copy-forgery-inhibited pattern merely exhibits a pattern or a background image on its original as printed matter is viewed by the human eyes, but predetermined characters or a certain image become visible if it is duplicated. Thus, this original gives a diversionary effect similar to that of the forgery preventing sheet.

The copy-forgery-inhibited pattern image can be composed of two zones, that is, a zone in which an image similar to that of the original remains in a duplicated matter, and a zone in which an image present in the original vanishes on a duplicated matter or a zone in which an image has a tone which is thinner than that of the zone in which the image remains. The copy-forgery-inhibited pattern image, which can be composed of these two zones, can have a substantially equal density between both zones in a condition in which it is printed out. That is, it is required to constitute the printed-out copy-forgery-inhibited pattern image in such a way that characters or the like which become visible on a duplicated matter is hidden, and accordingly, it can hardly be recognized by the human eyes in a macroscopic view. The image zone that is hidden in a printed-out matter of a copy-forgery-inhibited pattern image but becomes visible so as to be recognized through the human visual sense on a duplicated matter on which the printed-out matter is duplicated is so called as "latent image". Further, the image zone which vanishes away on a duplicated matter or which has a density lower than that of the latent image that is visible on the duplicated matter is so conveniently called as "background (or background image)". Further, the copy-forgery-inhibited pattern image can be basically composed of the latent image and the background image. It is noted that the latent image is also called as a foreground image in view of the terminology of a user interface.

It is noted that the copy-forgery-inhibited pattern printing should not be limited to the configuration as stated above, but there may be such a configuration that a string or the like is reproducible at a recognizable level on a duplicated matter. That is, even in such a condition that a string is designated as a background part, and characters are exhibited in a reversed condition during duplication, the copy-forgery-inhibited pattern printing may achieve its purpose.

By the way, in a system in which image data is delivered from a host unit to a printing apparatus for printing, if a copy-forgery-inhibited pattern image as stated above is printed together with image data, a certain instruction relating to copy-forgery-inhibited pattern printing is delivered from the host unit to the printing apparatus in order to print the copy-forgery-inhibited pattern image. As one configuration thereof, there has been presented such a configuration that information exhibiting a copy-forgery-inhibited pattern image is transmitted as instructing information to the printing apparatus together with image data, and accordingly, the printing apparatus generates a copy-forgery-inhibited pattern image, based on the information (Japanese Patent Laid-Open Publication No. 2001-346032). Further, as another configuration, there has been known such a configuration that a copy-forgery-inhibited pattern image previously held in the printing apparatus is synthesized to image data received from a host unit in response to information instructing addition of a copy-forgery-inhibited pattern and delivered from the host unit (Japanese Patent Laid-Open Publication No. 2003-072166). Further, there has been also known such a configuration that a copy-forgery-inhibited pattern image is generated for original data read by a printing apparatus and usual printing data sent from the host unit even though no instruction is delivered from a host unit, and is then synthesized to the printing data (Japanese Patent Laid-Open Publication No. H07-231384).

However, should various patterns be present as to the above-mentioned copy-forgery-inhibited pattern printing, a problem of the contention between the host unit and the printing apparatus would be caused as to the copy-forgery-inhibited pattern printing in a printing system in which the host unit and the printing apparatus are connected to each other by way of an internet or the like.

That is, there would be caused such a case that the printing apparatus holds or generates a copy-forgery-inhibited pattern by itself while the host unit transmits information of a copy-forgery-inhibited pattern image to the printing apparatus. In this case, setting information as to a copy-forgery-inhibited pattern such as a content of a copy-forgery-inhibited pattern instructed by the host unit would be different from setting information as to a copy-forgery-inhibited pattern owned by the printing apparatus. Further, this difference in the setting information would cause hindrance to the build-up of an effective printing system.

Further, in the case of a multifunctional printing apparatus such as an MFP, it would be considered that the supervisor therefor sets printing of a copy-forgery-inhibited pattern image, that is, setting information for a copy-forgery-inhibited pattern solely owned by the printing apparatus is applied to an image from a specific user or an IP address in the host unit, or a specific image. In this case, it is desirable that the setting information of a copy-forgery-inhibited pattern owned by the printing apparatus is applied as far as possible, irrespective of the setting information of a copy-forgery-inhibited pattern transmitted from the host unit.

SUMMARY OF THE INVENTION

Embodiments of the present invention are devised in order to solve the above-mentioned problems. According to an aspect of the present invention, a printer and a method therefor are capable of appropriately printing a copy-forgery-inhibited pattern image, irrespective of difference in information between copy-forgery-inhibited patterns set respectively in a host unit and a printing machine.

According to an aspect of the present invention, a printer includes a synthesizing unit and a printing unit to print images synthesized by the synthesizing unit. The synthesizing unit is configured to synthesize a copy-forgery-inhibited pattern set in a host unit to an image based on printing data received from the host unit if the copy-forgery-inhibited pattern is set in the host unit. The synthesizing unit is further configured to synthesize a copy-forgery-inhibited pattern set in the printer to an image based on printing data received from the host unit if the copy-forgery-inhibited pattern is set in the printer. If the copy-forgery-inhibited patterns are set respectively in both host unit and printer, the synthesizing unit is configured to allow a user to select either a copy-forgery-inhibited pattern set in the host unit or a copy-forgery-inhibited pattern set in the printer and to synthesize the selected copy-forgery-inhibited pattern to an image based on printing data received from the host unit if the copy-forgery-inhibited patterns are set respectively in both host unit and printer.

Preferably, the synthesizing unit is configured to notify the user of contention between copy-forgery-inhibited pattern images which are set respectively in the host unit and the printer.

Further, according to another aspect of the present invention, a printer includes a synthesizing unit and a printing unit to print images synthesized by the synthesizing unit. The synthesizing unit is configured to synthesize a copy-forgery-inhibited pattern set in a host unit with an image based on printing data received from the host unit if the copy-forgery-inhibited pattern is set in the host unit. The synthesizing unit is further configured to synthesize a copy-forgery-inhibited pattern set in the printer with an image based on printing data received from the host unit if the copy-forgery-inhibited pattern is set in the printer. The synthesizing unit is capable of determining if copy-forgery-inhibited patterns are set respectively in both the host unit and the printer.

Preferably, if the synthesizing unit determines that the copy-forgery-inhibited patterns are set in both the host unit and the printer, the synthesizing unit is configured to synthesize the copy-forgery-inhibited pattern set in the printer to an image based on printing data received from the host unit. Preferably, the copy-forgery-inhibited pattern set in the host unit is overwritten and replaced with the copy-forgery-inhibited pattern set in the printer, and the synthesizing unit is configured to notify a user that the copy-forgery-inhibited pattern set in the printer is given preference to the copy-forgery-inhibited pattern set in the host unit. Preferably, if the synthesizing unit determines that the copy-forgery-inhibited patterns are set in both the host unit and the printer, the synthesizing unit is configured to cease to print printing data received from the host unit.

Preferably, the synthesizing unit is configured to notify a user that printing job is cancelled because of contention between copy-forgery-inhibited pattern images which are set respectively in the host unit and the printer. Preferably, if the synthesizing unit determines that the copy forgery-inhibited patterns are set in both the host unit and the printer, the synthesizing unit is configured to synthesize the copy-forgery-inhibited pattern set in the host unit with the copy-forgery-inhibited pattern set in the printer to synthesize the synthesized copy-forgery-inhibited pattern to an image based on printing data received from the host unit. Preferably, if the synthesizing unit determines that the copy-forgery-inhibited patterns are set in both the host unit and the printer, the synthesizing unit is configured to synthesize the copy-forgery-inhibited pattern set in the host unit to an image based on printing data received from the host unit. Preferably, the copy-forgery-inhibited pattern set in the printer is overwritten and replaced with the copy-forgery-inhibited pattern set in the host unit, and the synthesizing unit is configured to notify a user that the copy-forgery-inhibited pattern set in the host unit is given preference to the copy-forgery-inhibited pattern set in the host unit.

Further, according to another aspect of the present invention, a printer includes a memory unit configured to add, when storing an image data having a copy-forgery-inhibited pattern set in a host unit, identification information for identifying that a copy-forgery-inhibited pattern is set to store image data. The printer further includes a printing unit configured to print an image based on the image data stored in the memory unit, irrespective of whether a copy-forgery-inhibited pattern is set in the printer or not, if the identification information is added to the image data when the image data stored in the memory unit is printed.

Further, according to another aspect of the present invention, a printer includes a memory unit configured to store therein image data and copy-forgery-inhibited pattern image data, separate from each other, when the image data having a copy-forgery-inhibited pattern that is set in a host unit is to be stored. The printer further includes a printing unit configured to print an image wherein the image data stored in the memory unit is synthesized with an image set in the printer if the copy-forgery-inhibited pattern is set in the printer, and the printing unit to print an image wherein the image data stored in the memory unit is synthesized with the copy-forgery-inhibited pattern image data if no copy-forgery-inhibited pattern is set in the printer, when an image based on the image data stored in the memory unit is printed.

Further, according to another aspect of the present invention, a printer includes a memory unit to store therein image data and copy-forgery-inhibited pattern image data, separate from each other, when the image data having a copy-forgery-inhibited pattern that is set in a host unit is stored, and a printing unit configured to render selection of either an image set in the printer or the copy-forgery-inhibited pattern image stored in the memory unit if the copy-forgery-inhibited pattern is set in the printer, and to print an image wherein the image data stored in the memory unit is synthesized with the selected copy-forgery-inhibited pattern, when the image is printed based on the image data stored in the memory unit.

Further, according to another aspect of the present invention, there is provided a method including synthesizing a copy-forgery-inhibited pattern set in a host unit to an image based on printing data received from the host unit if the copy-forgery-inhibited pattern is set in the host unit, synthesizing a copy-forgery-inhibited pattern set in a printer to an image based on printing data received from a host unit if the copy-forgery-inhibited pattern is set in the printer, determining if copy-forgery-inhibited patterns are set in both the host unit and the printer, and printing the synthesized image.

The method further includes rendering an operator to select either the copy-forgery-inhibited pattern set in the host unit or the copy-forgery-inhibited pattern set in the printer if the copy-forgery-inhibited patterns are set respectively in both the host unit and the printer, and synthesizing the selected copy-forgery-inhibited pattern to an image based on printing data received from the host unit.

The method further includes synthesizing the copy-forgery-inhibited pattern set in the printer to an image based on printing data received from the host unit if copy-forgery-inhibited patterns are set in the both host unit and the printer. The method further includes overwriting the copy-forgery-inhibited pattern set in the host unit with the copy-forgery-inhibited pattern set in the printer, and notifying a user that the copy-forgery-inhibited pattern set in the printer is given preference to the copy-forgery-inhibited pattern set in the host unit.

The method further includes ceasing to print printing data received from the host unit if copy-forgery-inhibited patterns are set in both the host unit and the printer.

The method further includes synthesizing a copy-forgery-inhibited pattern set in the host unit to a copy-forgery-inhibited pattern set in the printer to synthesize the synthesized copy-forgery-inhibited pattern to an image based on printing data received from the host unit if copy-forgery-inhibited patterns are set in both the host unit and the printer. The method further includes synthesizing a copy-forgery-inhibited pattern set in the host unit to an image based on printing data received from the host unit if copy-forgery-inhibited patterns are set in both the host unit and printer. The method further includes overwriting the copy-forgery-inhibited pattern set in the printer with the copy-forgery-inhibited pattern set in the host unit, and notifying a user that the copy-forgery-inhibited pattern set in the host unit is given preference to the copy-forgery-inhibited pattern set in the host unit.

Further, according to another aspect of the present invention, there is provided a method including when image data having a copy-forgery-inhibited pattern set in a host unit is stored, adding identification information for identifying that a copy-forgery-inhibited pattern is set to store the image data in a memory unit, and printing an image based on the image data stored in the memory unit if the identification information is added, irrespective whether a copy-forgery-inhibited pattern is set in a printer or not, when the image based on the image data stored in the memory unit is to printed.

Further, according to another aspect of the present invention, there is provided a method including storing image data and copy-forgery-inhibited pattern image data in a memory unit, separate from each other, when the image having a copy-forgery-inhibited pattern set in a host unit is stored, printing an image wherein the image data stored in the memory unit is synthesized with an image set in a printer if a copy-forgery-inhibited pattern is set in a printer, and printing an image wherein the image data and copy-forgery-inhibited pattern image data stored in the memory unit are synthesized with each other if no copy-forgery-inhibited pattern is set in the printer, when an image based on the image data stored in the memory unit is printed.

Further, according to another aspect of the present invention, there is provided a method including storing image data and copy-forgery-inhibited pattern image data in a memory unit, separate from each other when image data having a copy-forgery-inhibited pattern set in a host unit is stored, rendering selection of either an image set in a printer or the copy-forgery-inhibited pattern image data if a copy-forgery-inhibited pattern is set in the printer, and printing an image in which the image data stored in the memory unit is synthesized with the selected copy-forgery-inhibited pattern, when an image based on the image data stored in the memory unit is to be printed.

With the configurations as stated above, a copy-forgery-inhibited pattern image may be appropriately printed even though copy-forgery-inhibited patterns are set respectively in both host unit and printer.

Further features and aspects of the present invention will become apparent from the following description of exemplary embodiments (with reference to the attached drawings).

BRIEF DESCRIPTION OF THE DRAWINGS

FIG. 10 is a block diagram illustrating a data format of copy-forgery-inhibited pattern setting information set using the dialog shown in FIG. 9A, according to an exemplary embodiment of the present invention.

FIG. 21 is a view illustrating an exemplary dialog screen which is displayed if strings in copy-forgery-inhibited pattern images of the host unit and the printer do not coincide with each other.

DESCRIPTION OF THE EMBODIMENTS

Detailed Explanation will be hereinbelow made of preferred embodiments of the present invention with reference to the accompanying drawings.

Figure 1:
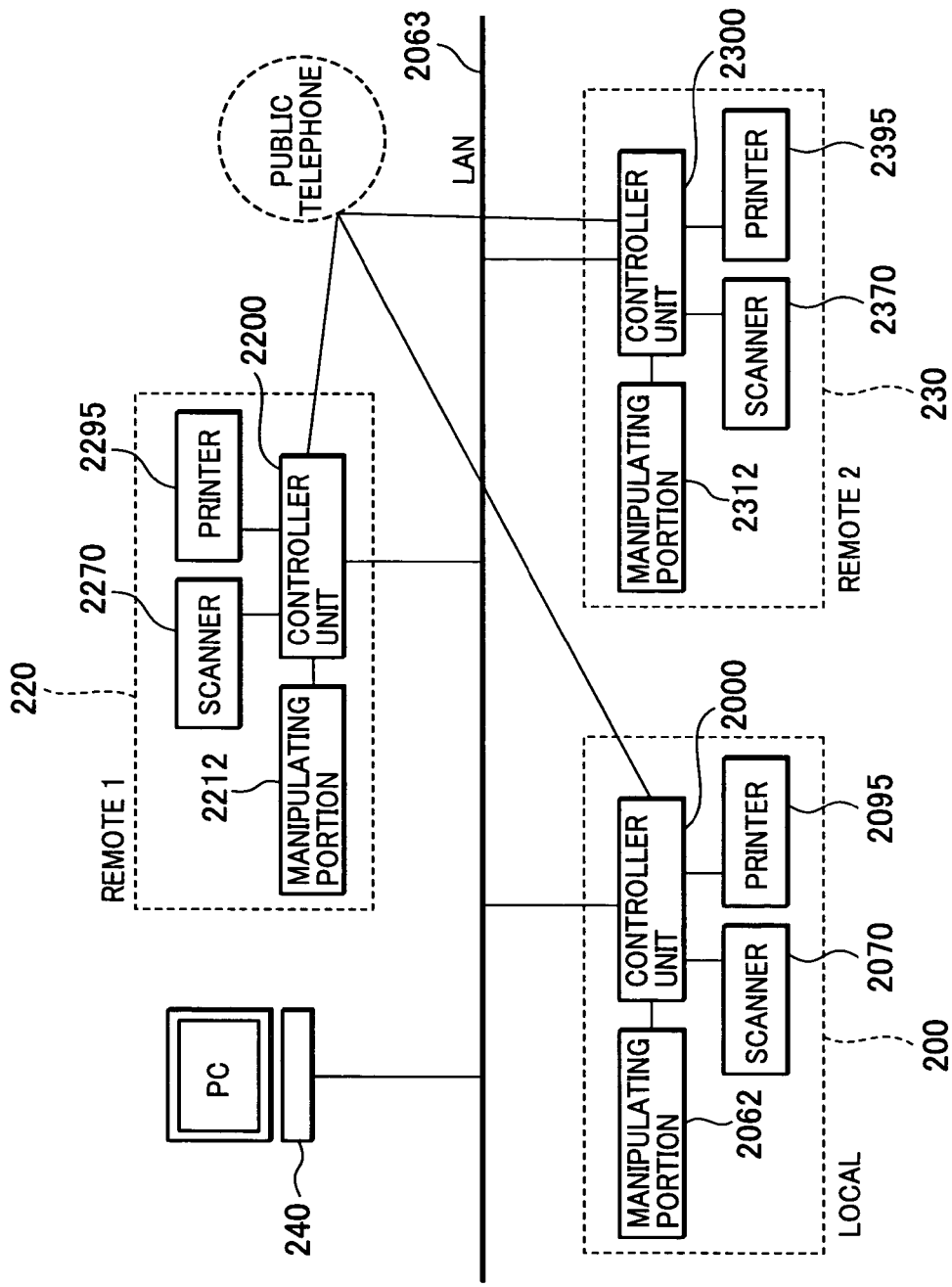
FIG. 1 is a block diagram illustrating a printing system according to an exemplary embodiment of the present invention.

Referring to FIG. 1, a printing system according to an embodiment of the present invention is illustrated. The printing system includes a personal computer (PC) 240 as a host unit and printers 200, 220, 230 as a multifunction printing machine, which are connected to one another by way of a network 2063. It is noted that although this figure shows only one personal computer 240 as a host unit, other host units such as PCs may be also connected so as to carry out printing similar to that performed by the PC 240.

Each printer 200 (220, 230) includes a scanner portion 2070 (2270, 2370) serving as an image input device, a printer portion 2095 (2295, 2395) serving as an image output device, a controller unit 2000 (2200, 2300) for executing data processing and control relating to the printer, and a manipulating portion 2062 (2212, 2312) serving as a user interface. The scanner portion 2070, the printing portion 2095 and the manipulating portion 2062 are connected to the controller unit 2000 which is connected to a network such as the LAN 2063 or a public line. Transmissions including a color image transmission may be made by G4 or G3 facsimiles by way of the public line. Further, the LAN 2063 is connected thereto with the printers 220, 230 having functions similar to that of the printer 200. These printers may transmit and receive a file, an electronic mail and the like to and from the PC 240 with the use of an FTP or SMB protocol.

With the configuration as stated above, the PC 240 sets information of a copy-forgery-inhibited pattern in relation to printing of a copy-forgery-inhibited pattern image which will be explained with reference to FIG. 19, and transmits the same to the printer 200 (220, 230) which is used for printing, together with an image data to be printed therewith.

Figure 2:
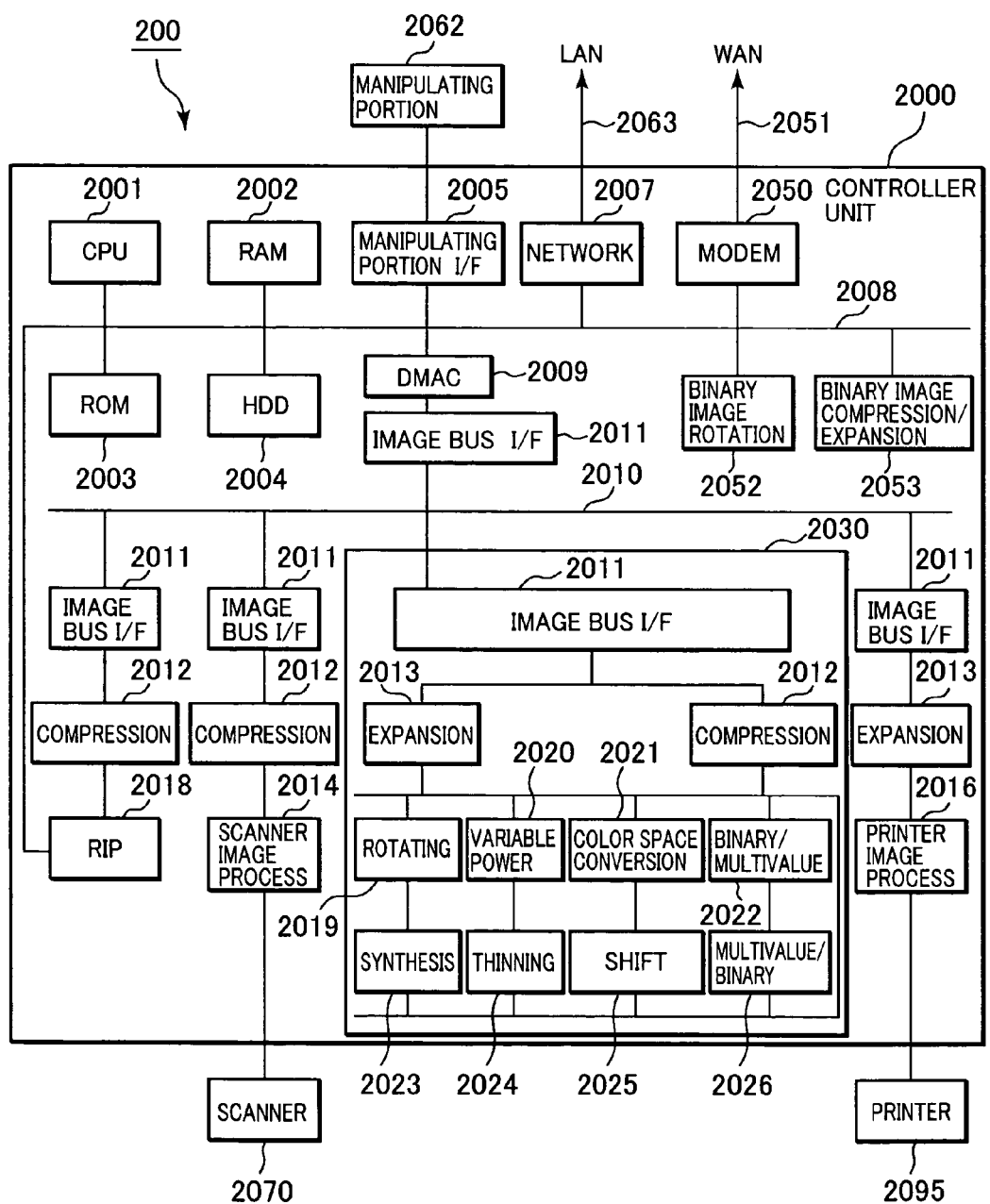
FIG. 2 is a block diagram illustrating a detailed configuration of a controller unit of a printer according to an exemplary embodiment of the present invention.

FIG. 2 shows a detailed configuration of the controller unit 2000 in the printer 200 according to an exemplary embodiment of the present invention. It is noted that the other printing apparatus such as a printer 220 or 230 may also have the same or similar configuration for the process used in printing, in particular, for printing a copy-forgery-inhibited pattern, which will be hereinbelow explained.

In the controller unit 2000, a CPU 2001 controls the overall system. A RAM 2002 is a system work memory for temporarily storing image data or the like. A ROM 2003 is a boot ROM in which a boot program for the system is stored. An HDD 2004 is a hard disc drive in which system software, images and the like are stored. A manipulating portion I/F 2005 is an interface portion with respect to the manipulating portion (UI) 2062, for outputting, to the manipulating portion 2062, data to be displayed on a display screen of the latter. Data inputted through the manipulating portion 2062 by the user is transmitted to the CPU 2001. A network 2007 that is connected to the LAN 2063 inputs and outputs information. For example, it inputs image data and data relating to a copy-forgery-inhibited pattern from the host PC (the host unit). A modem 2050 that is connected to the public line 2051 inputs and outputs image information. A binary image rotating portion 2052 and a binary image compression/explanation portion 2053 carry out changeover of a direction of an image, and also change-over of a resolution to a predetermined value or a value corresponding to a capability of a receiver before a binary image is transmitted by the modem 2050. The printer in this embodiment supports JBIG, MMR, MR and MH as to compression and expansion. A DMC 2009 is a DAM controller that reads an image stored in the RAM 2002, independent from the CPU 2001, transmits an image to an image bus I/F 2011 and writes an image from the image bus in the RAM 2002, independent from the CPU 2001. The above-mentioned devices are connected to the system bus 2008.

The image bus 2011 is an interface for controlling an input and output of an image by way of an image bus 2010 at a high rate. A compression portion 2012 is a compressor for JPEG compression of an image with a unit of 32 pixels×32 pixels before the image is delivered to an image bus 2010. An expansion portion 2013 is an expander for expansion of an image transmitted through the image bus 2010.

A raster image processor (RIP) 2018 receives PDL (Page Description Language) codes as printing data from the host unit by way of the network 2007, and the CPU 2001 stores these codes in the RAM 2002 by way of the system bus 2008. The CPU 2001 converts the PDL codes into intermediate codes and inputs them into an RIP 2018 again by way of the system bus 2008 so as to develop them into a bit map image (multivalued).

The scanner image processing portion 2014 carries out appropriate image processes (for example, correction, processing and edition) for a color image or a monochromatic image inputted at the scanner 2070 and outputs the processed data (multivalued). Similarly, a printer image process portion 2016 carries out various image processes (for example, correction, processing and edition) for creating an image data to be used in a printer 2095. During printing, binary/multivalued conversion is carried out at the expansion portion 2013, and accordingly, binary and multivalued outputs can be made.

The image converting portion 2030 has various image converting functions adapted to be used for rewriting, on a RAM, an image into which an image on the RAM has been converted. That is, a rotating portion 2019 can rotate an image having a unit of 32 pixels×32 pixels by a designated angle, corresponding to binary and multivalued input and output. A variable power portion 2020 has a function capable of changing a resolution of an image (for example, from 600 dpi to 200 dpi) and a function capable of changing a power (for example, 25% to 400%). Before changing the power, an image having a unit of 32×32 pixels are rearranged into an image having a unit of 32 lines. A color space converting portion 2021 converts a multivalue-inputted image, for example, a YUV image on a memory into a Lab image with the use of a matrix computation and an LUT, and stores the converted image on the memory. Further, the color space conversion includes 3×8 matrix computation and one-dimensional LUT, and can carry out a background skipping process and a rear image pick-up preventing process. The converted image is outputted as a multivalued image. A binary-multivalue converting portion 2022 converts a one-bit binary image into a 256 gradation image. On the contrary, a multivalue-binary converting portion 2026 converts a 8-bit 256 gradation image on the memory into a one-bit 2 gradation image with the use of an error diffusion process or the like, and then stores the image in the memory. A synthesizing portion 2023 has a function capable of synthesizing two multivalued images (or two binary images) on the memory into a single multivalued image (or binary image). For example, by synthesizing an image of a business logo and an original image with each other, the business logo can simply be added to the original image. It is noted as to the synthesizing process that any suitable process which carries out OR-, AND-operation, exclusive OR operation or the like can be used in order to set a brighter pixel value and a darker pixel value to pixel values after the synthesis in view of a brightness level which is averaged for each pixel. Further, this synthesizing portion 2023 carries out a synthesizing process between a copy-forgery-inhibited pattern image and an image to be synthesized to the copy-forgery-inhibited pattern image. A thinning portion 2024 thins pixels in a multivalued image so as to carry out resolution conversion, being capable of outputting a multivalued image having a resolution of ½ ¼ or ⅛. In combination with the variable power portion 2020, it can scale up and down an image in a broader range. A shift portion 2025 applies or removes a marginal part to and from an inputted binary or multivalued image, and then outputs the image. The rotating portion 2019, the variable power portion 2020, the color space converting portion 2021, the binary-multivalued converting portion 2022, the synthesizing portion 2023, the thinning portion 2024, the shift portion 2025, the multivalued-binary converting portion 2026 can be operated being linked with one another, that is, for example, the rotation of the multivalued image and the conversion of resolution can be made by linking them with no intervention of the memory therebetween.

The image processing function of the controller unit 2000 in the printer 200 as stated above, carries out a process relating to copy-forgery-inhibited pattern printing according to several embodiments of the present invention, which will be explained hereinbelow.

Figure 3:
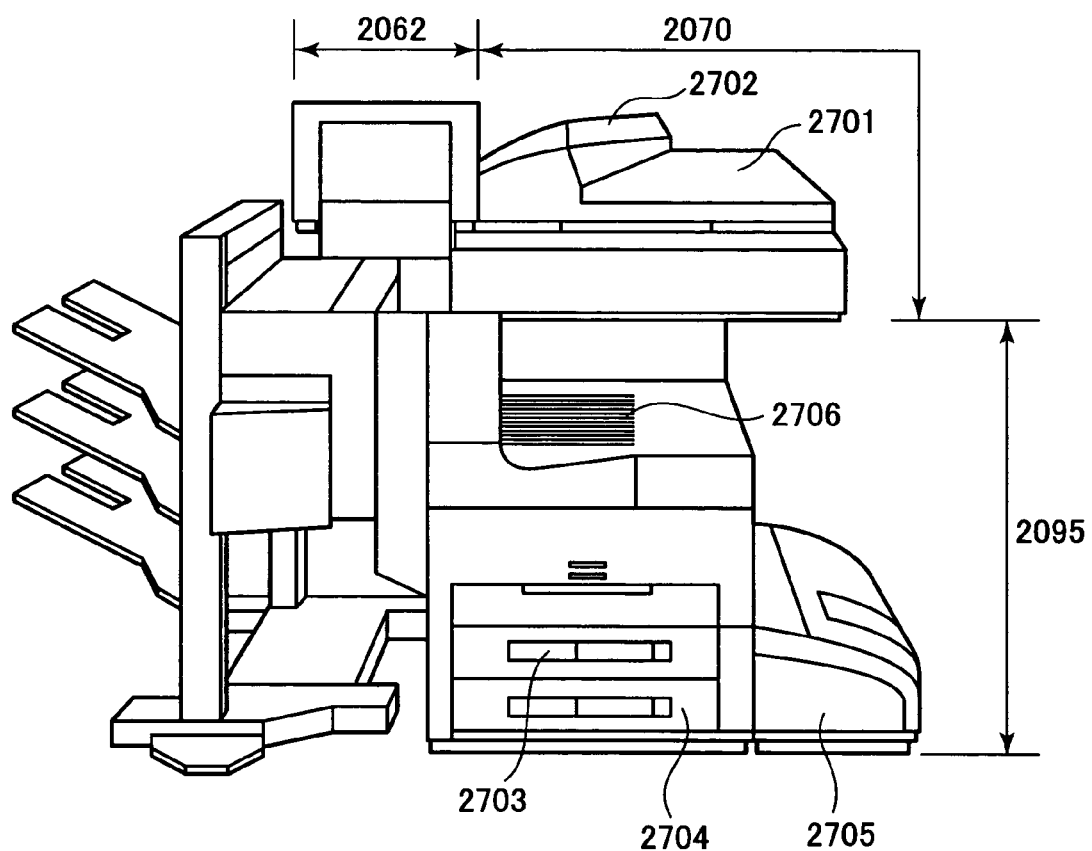
FIG. 3 is a perspective view illustrating an external appearance of the printer (multi-function printer) according to an exemplary embodiment of the present invention.

Referring to FIG. 3, an external appearance of the multi-function printer 200 according to an exemplary embodiment of the present invention is illustrated. The multi-function printer 200 includes the scanner portion 2070 serving as an image input portion irradiates an image on a paper as an original with light and scans a CCD light sensor (which is not shown) so as to convert the image into raster image data in the form of electric signals. Original sheets are set in a tray 2702 in an original feeder 2701. Further, when the user inputs an instruction to start image reading through the manipulating portion 2062, the CPU 2001 in the controller unit 2000 sends an instruction for image reading to the scanner portion 2070. Based on the instruction from the CPU 2001, the scanner portion 2070 feeds the original sheets one by one from the tray 2702 in the original feeder 2701 so as to carry out the image reading of original images therefrom. The printer portion 2095 as an image output portion records an image on a sheet based on the raster image data. In an exemplary embodiment, an electro photographic system using a photosensitive drum is used. The printer 200 may employ any suitable system, including an ink-jet system having a micro nozzle array for ejecting ink so as to print an image on a sheet. The printing operation is started in response to an instruction from the CPU 2001. In an exemplary embodiment, the printer portion 2095 has a plurality of paper feed units so as to enable selection of any of different sheet sizes and any of different directions of a sheet. The plurality of paper feed units include sheet cassettes 2703, 2704, and 2705. Further, printed sheets are stacked in a paper discharge tray 2706.

Figure 4:
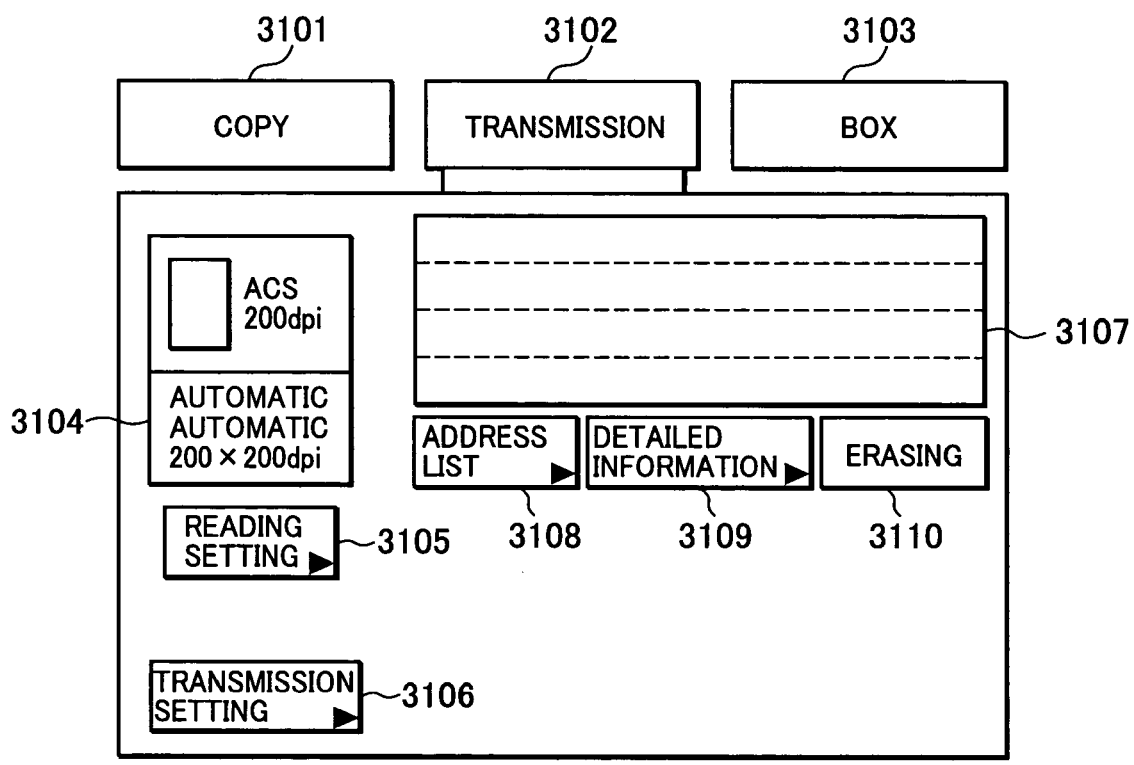
FIG. 4 is a view illustrating an initial dialog screen displayed on the printer according to an exemplary embodiment of the present invention.

Referring to FIG. 4, an initial dialog screen (which is a standard screen reset after setting any of various image forming modes) displayed on a display of the printer 200 according to an exemplary embodiment of the present invention is illustrated. In the initial screen, a "COPY" tab 3101 is provided for changing over the screen into the one for setting a copy mode. A "TRANSMISSION" tab 3102 is provided for changing to another screen for selecting a transmission mode through which a scanned image is transmitted by using a facsimile and/or an electronic mail. A "BOX" tab 3103 is provided for changing to yet another screen for storing a scanned image or a PDL image into an internal HDD, or for printing, transmitting or editing a read image or a PDL image stored therein. In addition, the initial dialog screen may further include a "PDL PRINT" tab (which is not shown) for setting the operation of the printer for carrying out printing based on PDL data from the host unit. A resolution and a density in reading an image are set by a reading setting button 3105. Further, there is shown a window for displaying a setting upon setting of image reading set by the above-mentioned image reading setting button 3105. A transmission setting button 3106 is provided for selecting a timer setting upon timer transmission and for printing an image stored in the HDD by the printer. A display portion 3107 displays addresses designated by an address list table 3108. A detailed information button 3109 is a button for displaying details of one of addresses displayed on the display portion 3107. An erasing button 3110 is provided for selectively erasing one of the addresses displayed on the display portion 3107.

Figure 5:
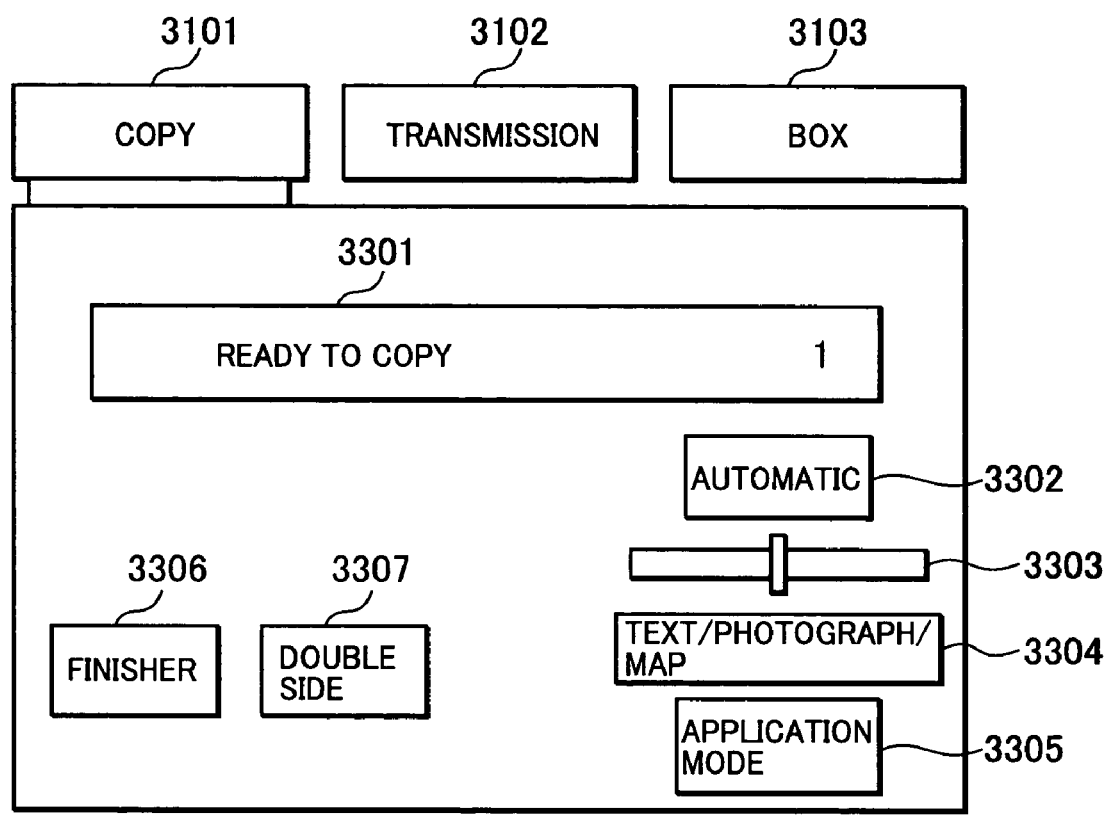
FIG. 5 is a view illustrating a dialog screen displayed when a copy tab of the initial screen in FIG. 4 is selected, according to an exemplary embodiment of the present invention.

Referring to FIG. 5, a copy-tab-selected dialog screen according to an exemplary embodiment of the present invention is illustrated. The copy-tab-selected dialog screen is displayed when the copy tab 3101 shown in FIG. 4 has been depressed. The copy-tab-selected dialog screen includes a display portion 3301 for displaying information as to whether or not the printer is ready to copy, and for simultaneously displaying thereon a set number of copies. An automatic button 3302 is provided for selecting whether or not a background is automatically removed. A slider 3303 is provided for adjusting a density through 9 stages when it is manipulated. A text/photograph/map button 3304 is provided for selecting a type of an original, that is, for selecting any one of text/photograph/map, text, photograph, and gravure. An application mode button 3305 is provided for setting an application mode, such as, for example, a scale-down layout (a function of printing a plurality of originals in a scaled-down size), a color balance (e.g., for adjusting colors of C, M, Y, K). A finisher button 3306 is provided for setting any one of a shift sorting mode, a staple sorting mode and a group sorting mode in relation to various finishing. A double-side button 3307 is provided for setting a mode relating to double-sided reading or double-sided printing. It is noted that the above-mentioned application mode button 3305 is prepared on the screen for the PDL mode which is changed over by the "PDL PRINT" tab (which is not shown) on the initial screen shown in FIG. 4. The copy-forgery-inhibited pattern printing which will be explained with reference to FIGS. 11 to 30 can be set by depressing the application mode button 3305.

Figure 6:
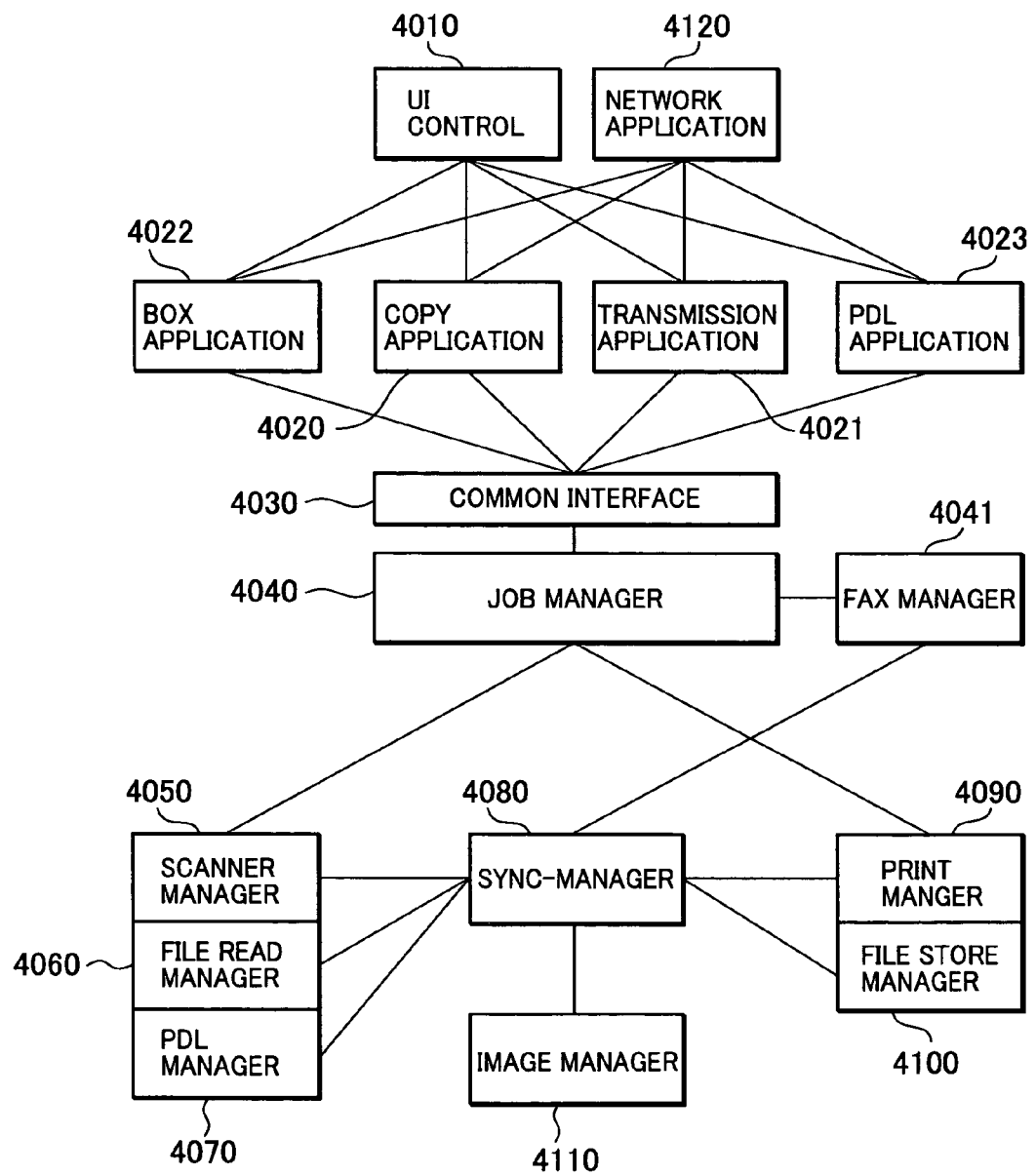
FIG. 6 is a block diagram illustrating a configuration of software executable by the printer, according to an exemplary embodiment of the present invention.

Referring to FIG. 6, a configuration of software operated in the printer 200 is illustrated, according to an exemplary embodiment of the present invention. The software includes a user interface (UI) control portion 4010 for controlling the displayed manipulating portion, and sending an instruction to a copy application 4020 for carrying out a copying operation. Also included in the software executed by the printer 200 are a transmission application 4021 for carrying out a transmitting operation and a BOX application 4022 for carrying out scanning and/or printing from the BOX screen. Each of the copy application 4020, transmission application 4021 and BOX application 4022 carries out each operation based on an instruction from the UI control portion 4010. A PDL application 4023 receives PDL printing data from a network application 4120 and generates a PDL print job. A common interface 4030 carries out a process for absorbing an equipment dependant part of an equipment control portion. In particular, each apparatus such as a scanner, a printer, or the like has a control unit and control parameters, respectively, which are specific to each apparatus. On the contrast, the application modules 4010, 4120 4022, 4020, 4021 and 4023 are configured to be capable of processing without depending on each apparatus such as a scanner, a printer, or the like. For example, the PDL application 4023 sends a versatile printing instruction to the common interface 4030, in response to a printing instruction by a user, without special consideration of the kind of connected printers. The common interface 4030 processes the received versatile printing instruction to a printing instruction in consideration of a fixing time or the like which is specific to the printer and sends it to the print manager 4090. A job manager 4040 receives job information through the common interface 4030, manages the received job information, and then transfers each job information to one of lower layer document processing portions (a fax manager 4041, a scanner manager 4050, or a print manager 4090) so that an operation corresponding to the job information is carried out. A local copying is carried out by the scanner manager 4050 and the print manager 4090. A transmission job in remote printing or a transmission job alone is carried out by the scanner manager 4050 and a file store manager 4100. A receiving job in remote copying is carried out by a file read manager 4060 and the print manager 4090. A PDL printing such as LIPS, PostScript or the like is carried out by a PDL manager 4070 and the print manager 4090. A sync-manager 4080 synchronizes the managers thereamong, and requests an image process to an image manger 4110. The image manager 4110 carries out various image processes, and the image manager 4110 carries out an image process for scanning or printing, and stores the image into an image file.

Figure 7:
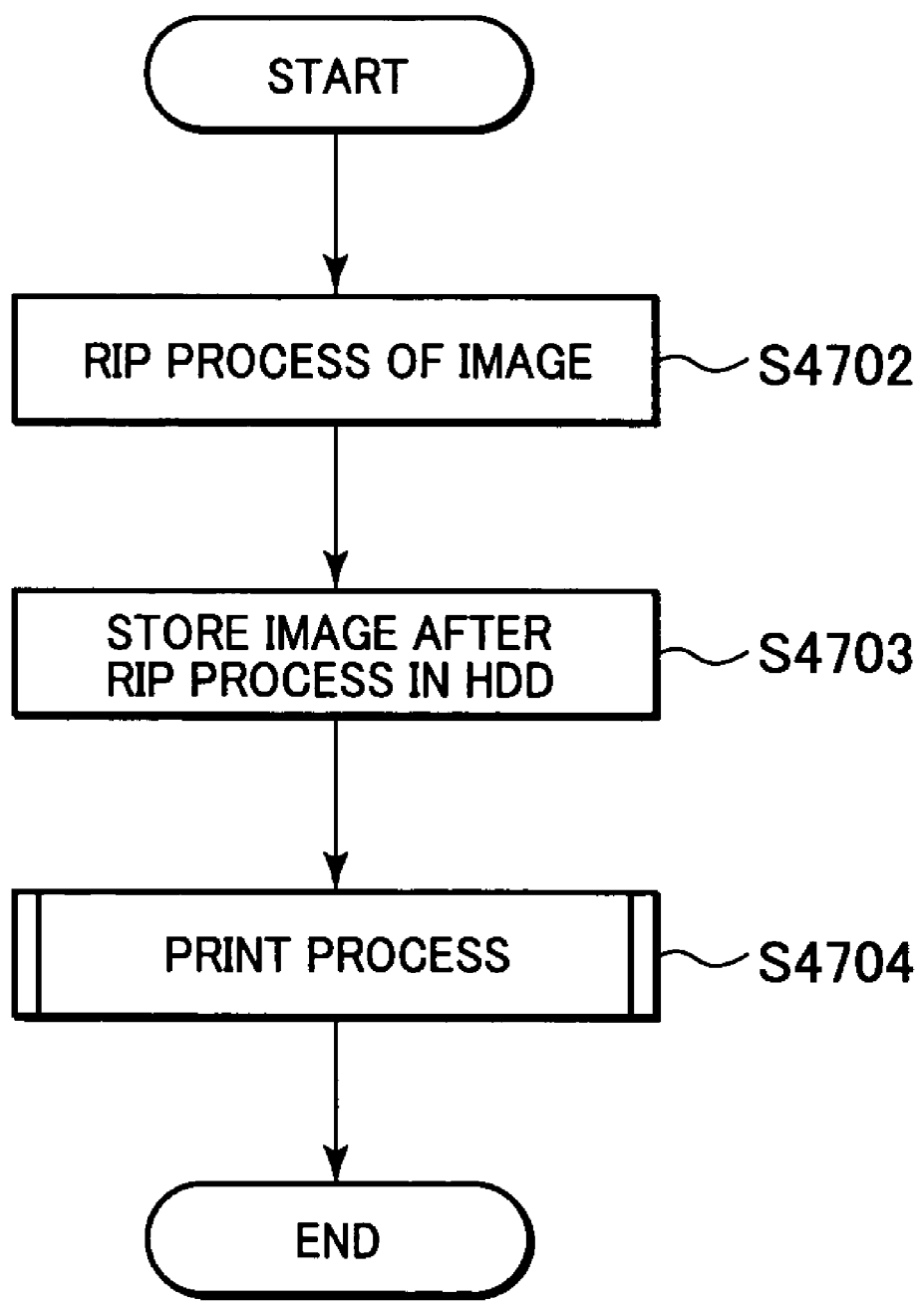
FIG. 7 is a flowchart illustrating a process of developing and storing PDL data according to an exemplary embodiment of the present invention.

Referring to FIG. 7, a flowchart illustrates a process of developing (expanding) and storing PDL data (a PDL developing and storing job) according to an exemplary embodiment of the present invention. The host PC 240 sends a request of PDL printing to the printer 200 via the network 2063. The PDL printing request from the host PC 240 is transferred to the PDL application 4023 through the network application 4120. The PDL application 4023 instructs the PDL developing and storing job to the job manager 4040 through the common interface 4030. Then, the PDL manager 4070 and the file store manager 4100 receive a request (instruction) from the job manager 4040. Accordingly, an image RIP process (S4702) is carried out. The image RIP process includes a process of determining whether an image is text, text/photograph, or photograph. Once the image RIP process has been completed, the image (including text/photograph determination information) on a memory (not shown) is stored in the HDD 2004 (S4703). During the execution of step S4703, page information is stored as information associated with the image in an SRAM (not shown). In the case of storing a PDL image as a document in a box, document information and box information are also stored in the SRAM. The stored information includes information as to whether the image is monochromatic or not, whether the original data is PDL data or not, or whether a color space is a CMYK space or a RGB space. Once the storing of the PDL image in the HDD 2004 has been completed, the sync-manager 4080 sends a notification of completion of the storing to the job manager 4040. The job manager 4040 sends the notification of the storing completion to the PDL application 4023 through the common interface 4030. After receiving this notification, the PDL application 4023 sends the notification of the storing completion through the network application 4120 to the host PC 240 which has requested the PDL print. Further, in the case of the PDL print job, an image developed (expanded) on the memory is printed under the control of the PDL manager 4070 and the print manager 4090 (S4704). In the case of printing the developed and stored image of the PDL data in the memory, the document to be printed is selected by the UI control 4010, and the UI control 4010 issues a print job of the selected document, and sends the print job to the BOX application 4022. The BOX application 4022 transfers the print job to the job manager 4040 through the common interface 4030. The file read manager 4060 receives an instruction for reading an image (file) to be printed from the job manager 4040. The job manager 4040 sends an instruction for developing (expanding) an image to be printed in the file read from the HDD into the memory to the image manager 4110 through the sync-manager 4080.

The print manager 4090 sends a request for printing to the printer 2095 through a device I/F when the developed image is stored in the memory, and concurrently, the print manager 4090 sends a request for processing the image to be printed to the sync-manager 4080. Thus, the processes for printing and a process in the printer portion 2095 starts.

Figure 8:
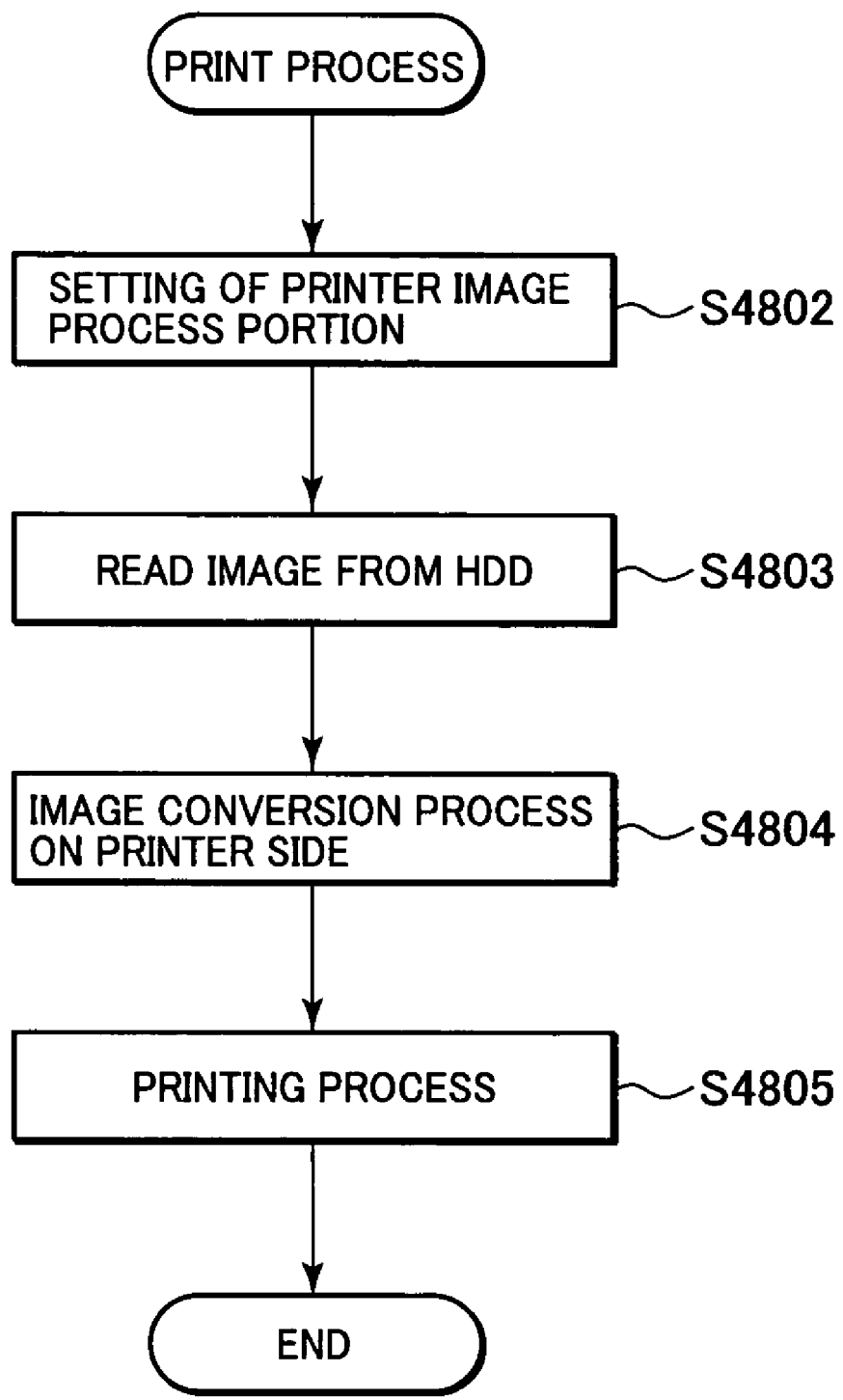
FIG. 8 is a flowchart illustrating operations involved in the print process shown in FIG. 7, according to an exemplary embodiment of the present invention.

Referring to FIG. 8, a flowchart illustrates operations involved in a print process (S4707) shown in FIG. 7 according to an exemplary embodiment of the present invention. In the printer portion 2095, the sync-manager 4080 receives the request for processing the image to be printed from the print manager 4090 so as to request the image manager 4110 to set an image process. The image manager 4110 configures the printer image process portion 2016 in accordance with the information associated with the above-mentioned image (the information stored in the SRAM) (S4802). The image manager 4110 reads out an image to be processed from the HDD 2004 (S4803), performs a conversion process of the read image on the memory, and thereafter, informs the print manager 4090 of completion of preparation for printing through the sync-manager 4080 (S4804). Creation of a copy-forgery-inhibited pattern image and a process of adding the copy-forgery-inhibited pattern image to the image read out from the HDD are carried out at the step S4804. The print manager 4090 sends a request (instruction) for printing to the printer portion 2095 (S4805). The completion of transmission of an image to be printed is informed to the image manager 4110 in response to an interrupt signal from a hardware (not shown). The sync-manager 4080 receives a notification of completion of printing from the image manager 4110, and then, the sync-manager 4080 informs the print manager 4090 of completion of printing. The print manager 4090 receives a notification of completion of paper discharge from the printer portion 2095, and sends back a notification of termination to the job manager 4040. Then, the job manager 4040 sends back the termination notification to the copy application portion 4020 through the common interface 4030.

Explanation will be made of setting of copy-forgery-inhibited pattern printing in each of the host PC and the printer in the configuration of the printing system according to the embodiment of the present invention.

At first, explanation will be made of the process of setting copy-forgery-inhibited pattern information in the host PC 240 for transmitting image data of a PDL (Page Description Language) type to the printer 200.

Figure 9A:
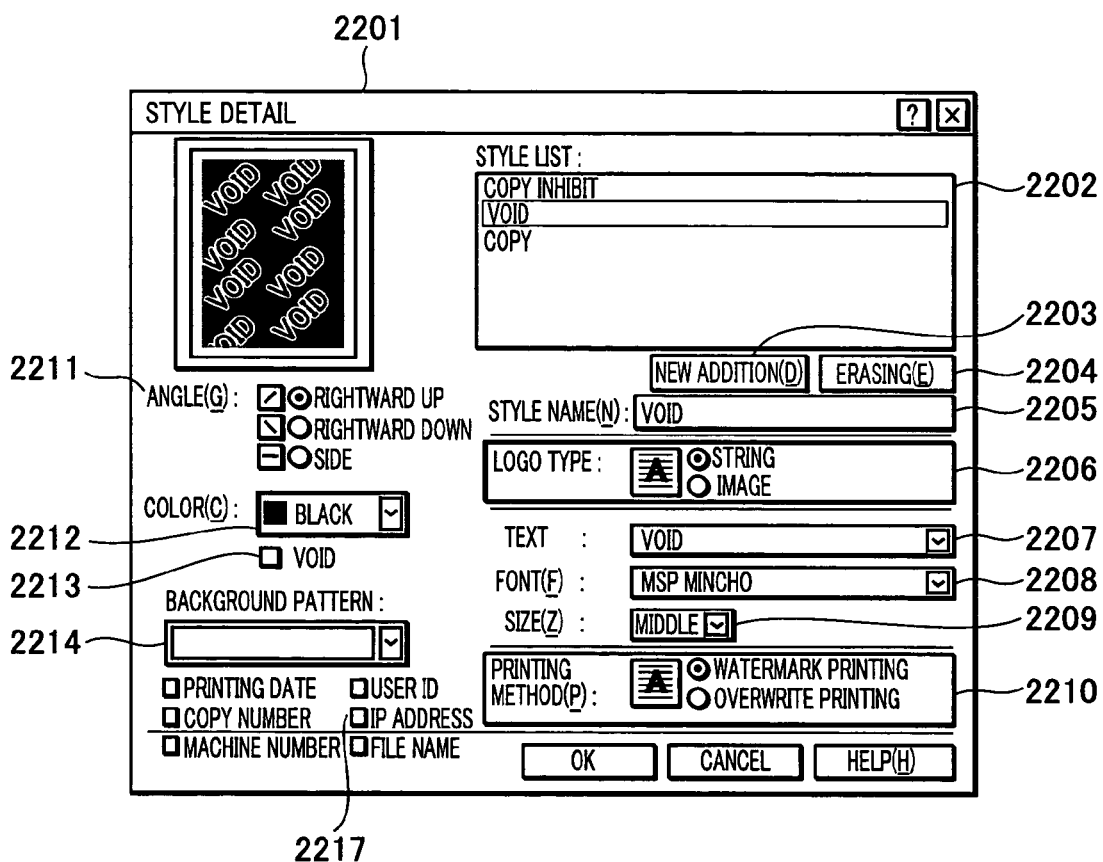
FIG. 9A is a view illustrating a dialog screen for setting copy-forgery-inhibited pattern options, according to an exemplary embodiment of the present invention.

FIG. 9A illustrates a dialog screen with which the user can edit the setting of the copy-forgery-inhibited pattern printing, according to an exemplary embodiment of the present invention.

In the dialog screen 2201 for editing copy-forgery-inhibited pattern information, a result of the copy-forgery-inhibited pattern image generated by each copy-forgery-inhibited pattern information, for preview, is displayed, which will be hereinbelow explained. There is shown a zone 2202 in which a list of selectable styles is displayed. Further, with the use of the buttons 2203, 2204, a style may be newly added or deleted. There is also shown a zone 2205 on which a name of a presently designated style is displayed.

Figure 9B:
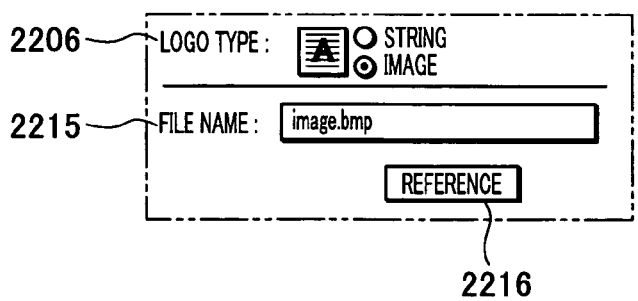
FIG. 9B is a view illustrating the logo select button of the dialog in FIG. 9A according to an exemplary embodiment of the present invention.

A radio button 2206 is provided for selecting a kind of a drawing object used in the copy-forgery-inhibited pattern printing. If the user selects a "STRING" option by using the radio button 2206, a text object may be used. Further, when the user selects an "IMAGE" option, image data may be used, which is typically saved in bit-mapped graphics format (BMP). When the "STRING" option is selected as shown in FIG. 9A, setting information in relation to text objects indicated by reference numerals 2207 to 2209 is displayed on the dialog 2201, and may be edited by the user. Meanwhile, if the "IMAGE" option is selected by the radio button 2206, the information 2207 to 2209 is not displayed, but, instead, a name of an image file 2215 and a button 2216 for displaying a file selecting dialog (not shown) are displayed, as shown in FIG. 9B. Reference numeral 2207 designates a zone for displaying and editing a string used as a copy-forgery-inhibited pattern image, and the reference numeral 2208 designates a zone for displaying and editing font information of a string.

Although the screen is used for selecting only a font name in this embodiment, the screen may be broadly used for selecting family information of a type face (bold, italic or the like), information of decorative characters, or the like. Reference numeral 2209 designates a zone for displaying and setting a font size of a string used as a copy-forgery-inhibited pattern.

Further, a radio button 2210 is provided for selecting a printing order of the copy-forgery-inhibited pattern image and original data. If "transparent printing" option (referred to as "Watermark Printing" in FIG. 9A) is designated by the button 2210, the original data is drawn after the copy-forgery-inhibited pattern is drawn. Meanwhile, if "overprinting" option (referred to as "Overwriting Printing" in FIG. 9A) is designated by the button 2210, the copy-forgery-inhibited pattern is drawn after the original data is drawn. A radio button 2211 is provided for designating an angle of orientation of a copy-forgery-inhibited pattern. In this embodiment, any one of three kinds, that is, "rightward up", "rightward down" or "horizontal (side)" may be selected. There are shown a zone 2212 for displaying and designating a color used for a copy-forgery-inhibited pattern (a foreground pattern or a background pattern), and a check box 2213 for replacement between a foreground pattern and a background pattern. If the check box 2213 is not checked, a copy-forgery-inhibited pattern image is generated so as to cause a foreground pattern to be visible on a duplicated matter. That is, the check box 2213 being unchecked indicates that the setting is made so as to reproduce the foreground pattern on the duplicated matter. Meanwhile, if the check box 2213 is checked, a copy-forgery-inhibited pattern image is generated so as to cause the background pattern to be visible on the duplicated matter. That is, the check box 2213 being checked indicates that the setting is made so as to reproduce the background pattern on the duplicated matter. At this time, text information or image information designated to the foreground pattern is recognizable on the duplicated matter in a reversed state. A zone 2214 is the one for designating a camouflage image with which the human eyes can hardly recognize a copy-forgery-inhibited pattern image added to a printout matter. The camouflage image may be selected from a plurality of patterns. An option for not using a camouflage image is also provided.

Six check boxes 2217 are provided for designating addition of an associated information string checked by the user among these check boxes, to a string having a style selected in the zone 2202. For example, if "VOID" is selected in the style name list 2205 while "PRINTING DATE" check box is checked, "VOID" and "YYYY/MM/DD" (YYYY exhibits a year, MM a month and DD a date) are both printed in strings serving as the string of the copy-forgery-inhibited pattern image. The strings which are added by the check boxes 2217, are stored in a field 2002 shown in FIG. 10, which will be explained later, together with a string set in the style name list 2205. As to the kinds of strings, there may be used a "PRINTING DATE" which indicates date information upon issuance of PDL, "a number of copies", a "MACHINE NUMBER" which indicates an MAC address of the host PC 240 itself, a "USER ID" which indicates an user name in the host PC, an "IP address" of the host PC 240 itself, and a "FILE NAME" the original data has. The additional string selected by the user may use the same set value such as a font, a size, an angle or a color, which is set in this dialog 2201.

FIG. 10 shows a data format of copy-forgery-inhibited pattern setting information set using the dialog shown in FIG. 9A, according to an exemplary embodiment of the present invention. It is noted that the additional printing information which will be explained hereinbelow is stored in a job output file which is held as information constituting a physical page to be printed. There may be utilized various configurations for storing the added printing information, in addition to the configuration as stated above.

Referring to FIG. 10, in a field 2001, a value which indicates an object kind (a text type or an image) to be drawn by copy-forgery-inhibited pattern printing, which is designated in the zone 2206 shown in FIG. 9A, is stored. In a field 2002, setting information for a drawing object which is designated by the information in the field 2001, being designated in the zones 2207 to 2209 in FIG. 9A or FIG. 9B, is stored. Upon selection of a text, information as a string, font name information and size information are stored, but upon selection of an image, a location of an image file to be inputted is stored.

In a field 2003, information relating to a printing order such as whether a copy-forgery-inhibited pattern is drawn before or after printing original data, which is designated in the zone 2210 in FIG. 9A, is stored. In a field 2004, information of an angle by which a drawing object is orientated, and which is designated in the zone 2211 in FIG. 9A, is stored. In a field 2205, information of a color used in a copy-forgery-inhibited pattern (a foreground pattern or a background pattern), which is designated in the zone 2210 in FIG. 9A, is stored. In a field 2206, information as to a foreground pattern or a background pattern designated by the check box 2213 in FIG. 9A, is stored. In a field 2007, pattern additional information as to a camouflage image, which is designated in the zone 2214 in FIG. 9A, is stored. In a field 2208, information of a density of a foreground pattern is stored. In a filed 2009, information of a density of a background pattern is stored.

If designation is made in the check boxes 2217 in FIG. 9A, in a zone 2010, additional associated information such as "PRINTING DATE" as to a PDL issuance date, a "NUMBER OF COPIES", a "MACHINE NUMBER" which indicates a MAC address of the host PC 240 itself, a "USER ID" which is a user name in the host PC, an "IP ADDRESS" of the host PC itself or a "FILE NAME" original data has, is stored.

Next, explanation will be made of setting of information of a copy-forgery-inhibited pattern block in the printer 200 in this embodiment. That is, in a PDL print mode, it relates to the setting of copy-forgery-inhibited pattern data which is generated and synthesized in the printer 200 by itself, independent from data transmitted from the host PC 240.

Figure 11:
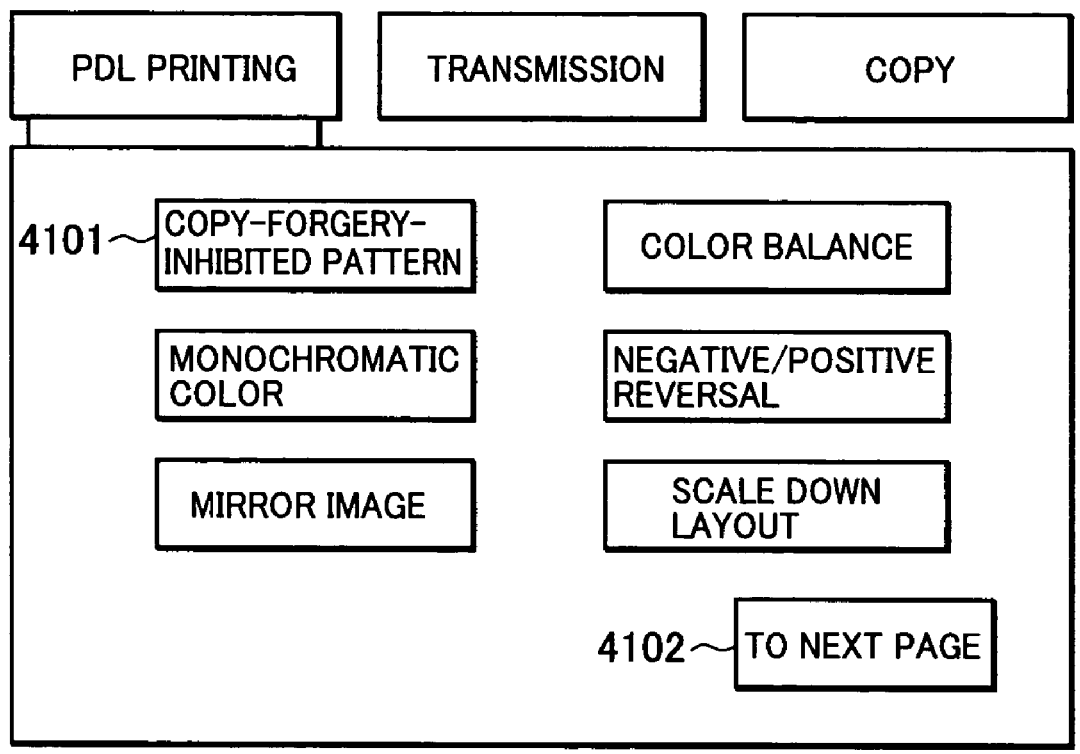
FIG. 11 is a view illustrating an application-mode-selected dialog screen according to an exemplary embodiment of the present invention.

Referring to FIG. 11, an application-mode-selected dialog screen according to an exemplary embodiment of the present invention is illustrated. The application-mode-selected dialog screen is displayed when an application mode button (e.g., the application mode button 3305 shown in FIG. 5) is selected by the user, in the PDL printing mode for carrying out printing in accordance with PDL data transmitted from the host unit. As stated above, a "COPY-FORGERY-INHIBITED PATTERN" button 4101 for setting those relating to the copy-forgery-inhibited pattern is displayed together with buttons for setting a scaled-down layout, a color balance and the like, which are conditions for PDL printing by depressing the application mode button. By depressing this button, copy-forgery-inhibited pattern information may be set in the printer 200 by itself.

Figure 12:
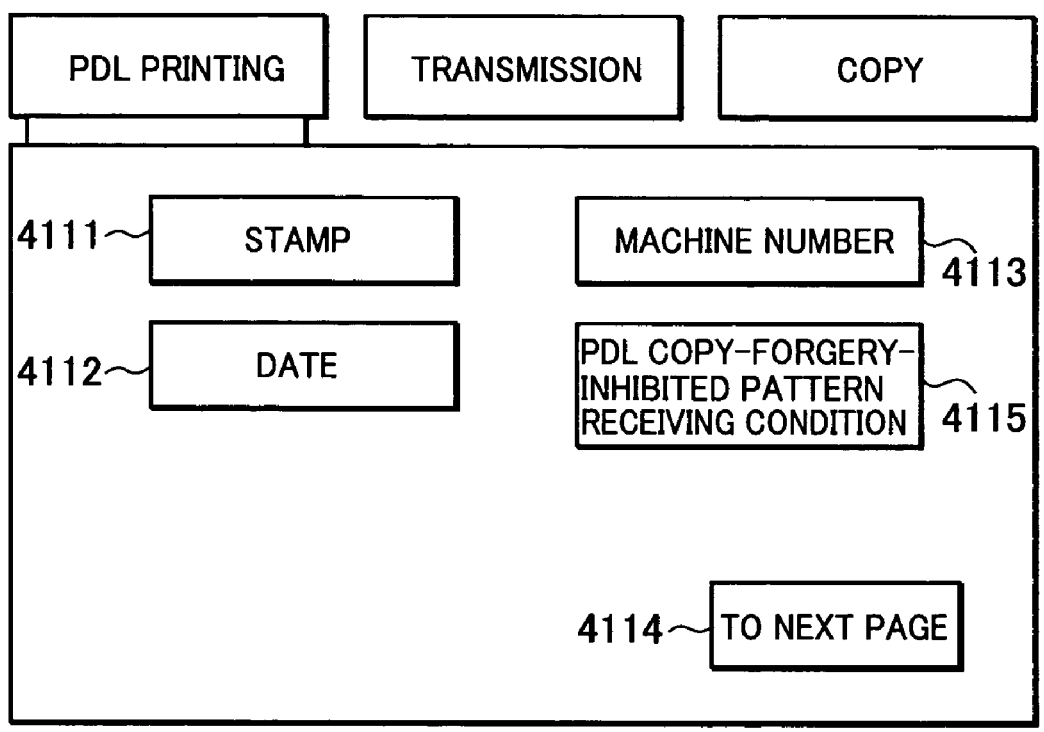
FIG. 12 is a view illustrating a dialog screen which is displayed when a copy-forgery-inhibited pattern setting button shown in FIG. 11 is selected, according to an exemplary embodiment of the present invention.

FIG. 12 shows a dialog screen that is displayed when a copy-forgery-inhibited pattern setting button 4101 in FIG. 11 is depressed, according to an exemplary embodiment of the present invention. When the user depresses buttons 4111, 4113, and 4112 on this dialog screen, corresponding one of a stamp, a machine number and date as information to be printed as a copy-forgery-inhibited pattern is selected. In addition, a number of copies, a user's ID number or the like may be selected. Further, the user is not limited selecting only one of them but may also select a plurality of them. Further, a button 4115 is provided for setting a condition of receiving copy-forgery-inhibited pattern information by the PDL, as will be explained later with reference to FIG. 18.

Figure 13:
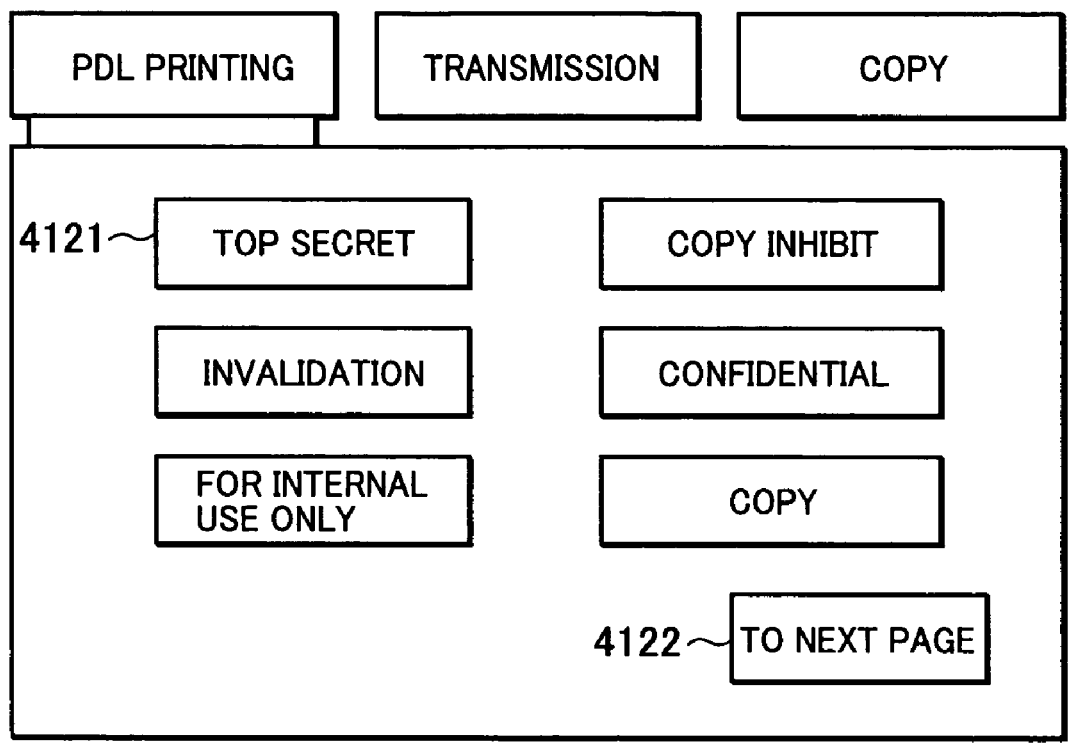
FIG. 13 is a view illustrating a screen which is displayed by depressing a "STAMP" setting button shown in FIG. 12, according to an exemplary embodiment of the present invention.

FIG. 13 shows a dialog screen that is displayed by depressing the "stamp" setting button 4111 shown in FIG. 12, according to an exemplary embodiment of the present invention. Using the screen illustrated in FIG. 13, the user may select a matter to be printed as a copy-forgery-inhibited pattern from six options, such as "TOP SECRET", "COPY INHIBIT", "INVALIDATION", "CONFIDENTIAL", "COMPANY SECRET" and "COPY". For example, if the button 4121 is depressed, the "TOP SECRET" option is selected. Further, when the button 4122 is depressed, a next setting screen such as a dialog screen shown in FIG. 14 is displayed.

Figure 14:
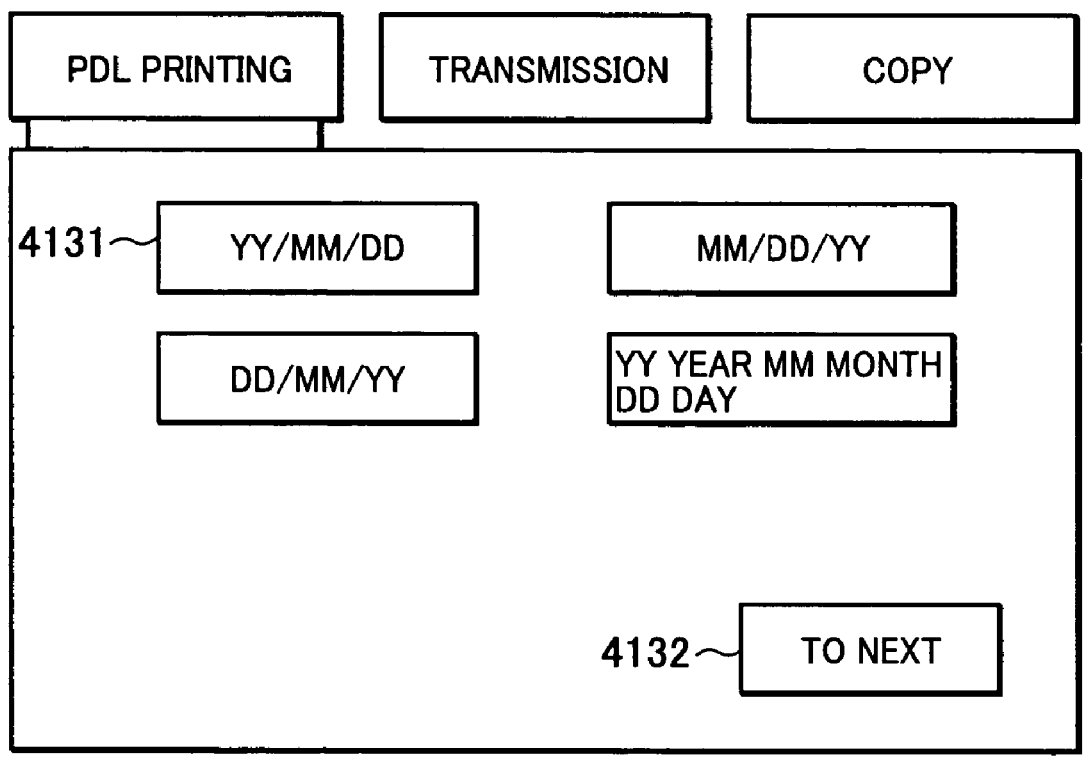
FIG. 14 is a view illustrating a dialog screen which is displayed when a data setting button shown in FIG. 12 is selected, according to an exemplary embodiment of the present invention.

FIG. 14 shows a dialog screen that is displayed when the date setting button 4112 shown in FIG. 12 is depressed, according to an exemplary embodiment of the present invention. Using the dialog screen illustrated in FIG. 14, the user may select any one four type faces, that is, YY/MM/DD, MM/DD/YY, DD/MM/YY and MM month, DD date and YY year. For example, if a button 4131 is depressed, the type face YY/MM/DD is selected. Further, when a button 4132 is depressed, a next setting screen such as shown in FIG. 15 is displayed.

Figure 15:
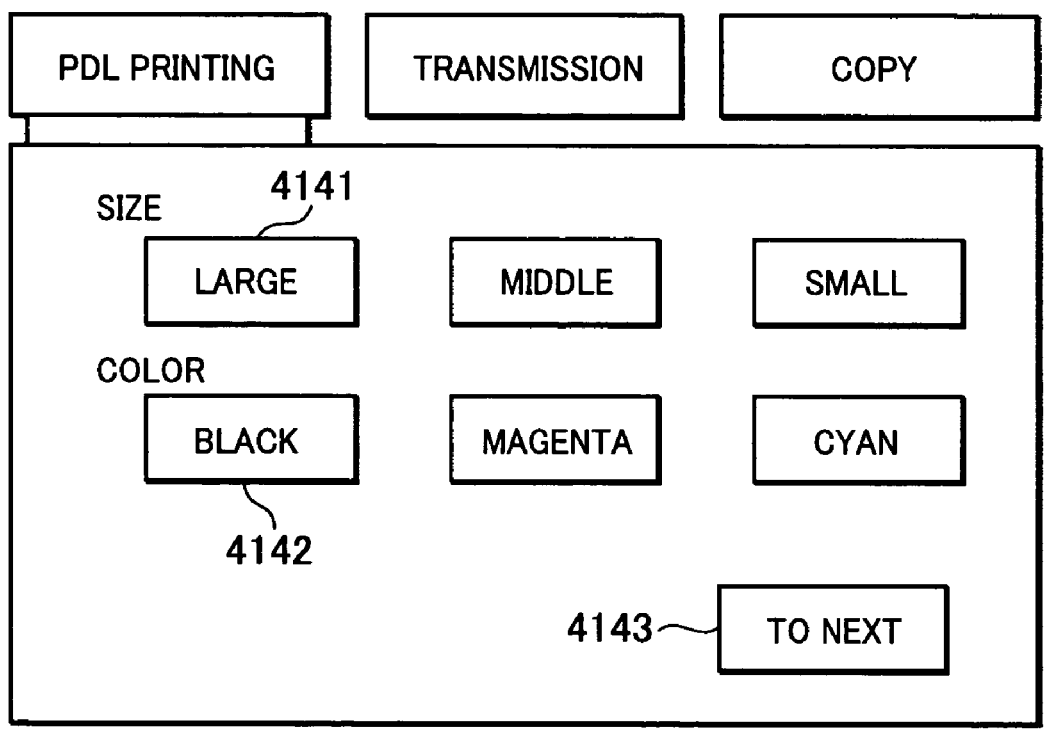
FIG. 15 is a view illustrating a dialog screen for setting common items in relation to copy-forgery-inhibited pattern images, according to an exemplary embodiment of the present invention.

Referring to FIG. 12, by depressing a machine number setting button 4113, a next setting screen shown in FIG. 15 is displayed. In this case, a machine serial number belonging to each of printers is printed as a copy-forgery-inhibited pattern image.

FIG. 15 shows a dialog screen for setting common items in relation to copy-forgery-inhibited pattern images, according to an exemplary embodiment of the present invention. By interacting with the dialog screen illustrated in FIG. 15, the user may select a size and a color of a font that is printed as a copy-forgery-inhibited pattern (a copy-forgery-inhibited pattern image). As the size of the font, any one of a large size, a middle size and a small size may be selected, and as to the color, any one of black, magenta and cyan may be selected. After selection of a size and a color of the font, when a button 4143 is depressed, a dialog screen shown in FIG. 16 is displayed as a next setting screen.

Figure 16:
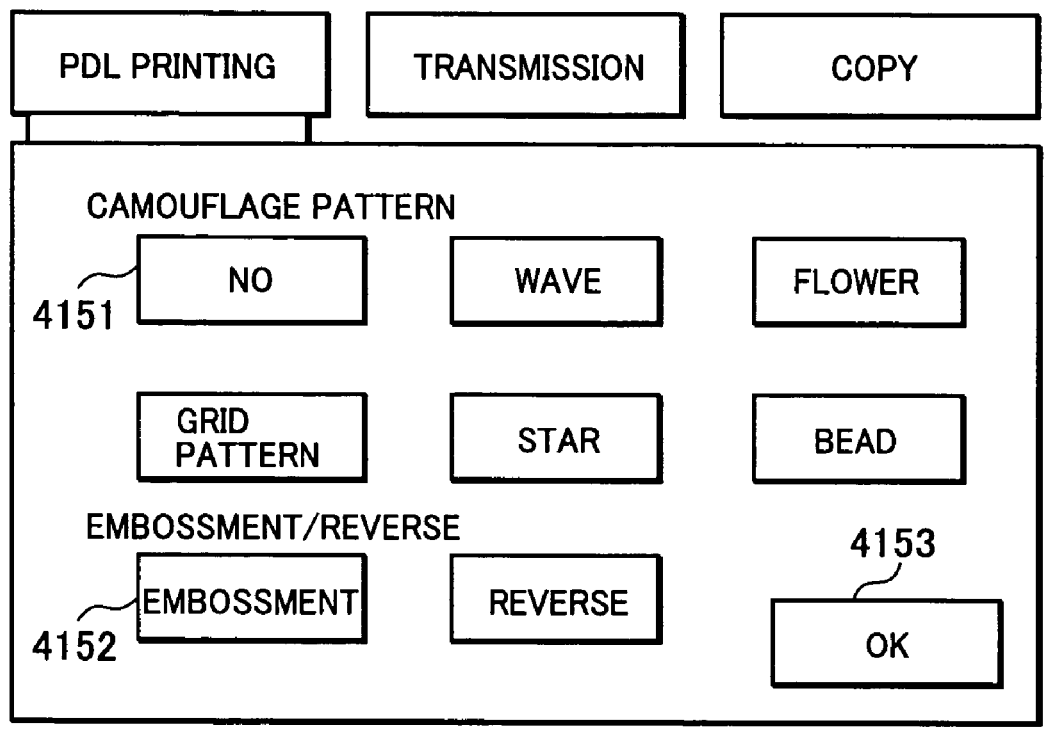
FIG. 16 is a view illustrating a dialog screen following the dialog screen shown in FIG. 15, according to an exemplary embodiment of the present invention.

FIG. 16 shows a dialog screen for following up the setting of common items, according to an exemplary embodiment of the present invention. By using this dialog screen, the user may select a camouflage pattern for printing a copy-forgery-inhibited pattern, and set embossment/reverse.

Each of the camouflage patterns is configured such that it is difficult for the human eyes to recognize a copy-forgery-inhibited pattern image added to a printout matter. As shown in FIG. 16, with the use of buttons provided in the Camouflage Pattern section of this dialog screen, any of a plurality of camouflage patterns such as "wave" or "flower" may be selected. Further, a button 4151 is provided for selecting a mode in which no camouflage pattern is used.

Figure 17A:
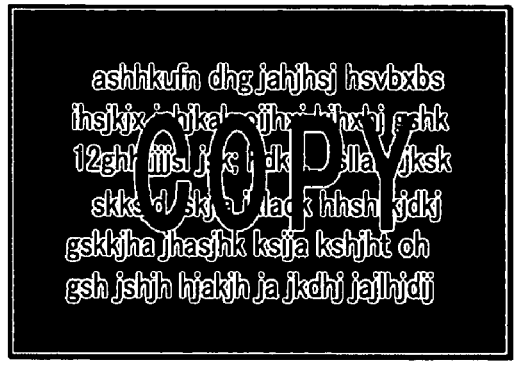
FIGS. 17A to 17C are views for illustrating embossment/reverse for visualizing either a copy-forgery-inhibited pattern image part or the other part, according to an exemplary embodiment of the present invention.
Figure 17B:
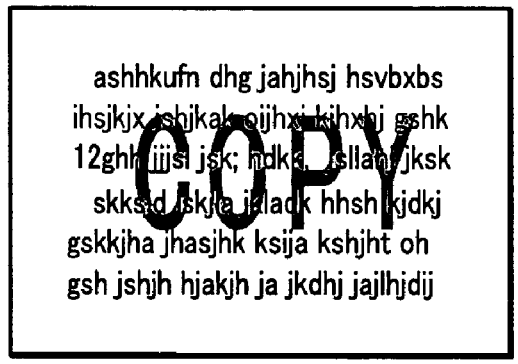
Figure 17C:
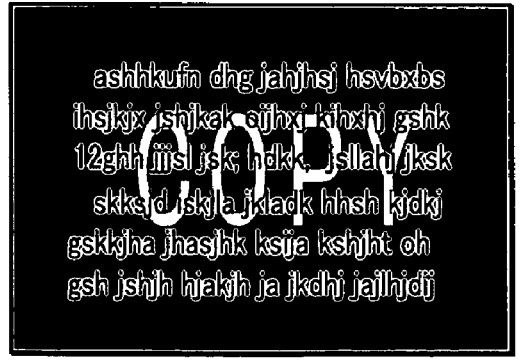

The setting of embossment/reverse is adapted to designate whether a part of information of a copy-forgery-inhibited pattern such as text information is visible or the other part is visible. FIGS. 17A to 17C shows the embossment/reverse according to an exemplary embodiment of the present invention. In the case of setting embossment, when an image on which a copy-forgery-inhibited pattern is printed as shown in FIG. 17A is duplicated, the copy-forgery-inhibited pattern image is produced so as to cause a latent image part ("COPY") of the copy-forgery-inhibited pattern image to be visible, as shown in FIG. 17B. At this time, letters or the like may be recognized on a duplicated matter in such a condition that the latent image part is embossed. Meanwhile, in the case of setting the reverse, as shown in FIG. 17C, a copy-forgeryinhibited pattern image is generated so as to cause a background part other than the copy-forgery-inhibited pattern image to be visible on the duplicated matter. At this time, characters or the like may be recognized in a reversed condition.

After a camouflage pattern and embossment/reverse are respectively selected on the setting screen shown in FIG. 16, by depressing a button 4153, all settings in relation to the copy-forgery-inhibited pattern printing are settled.

Figure 18:
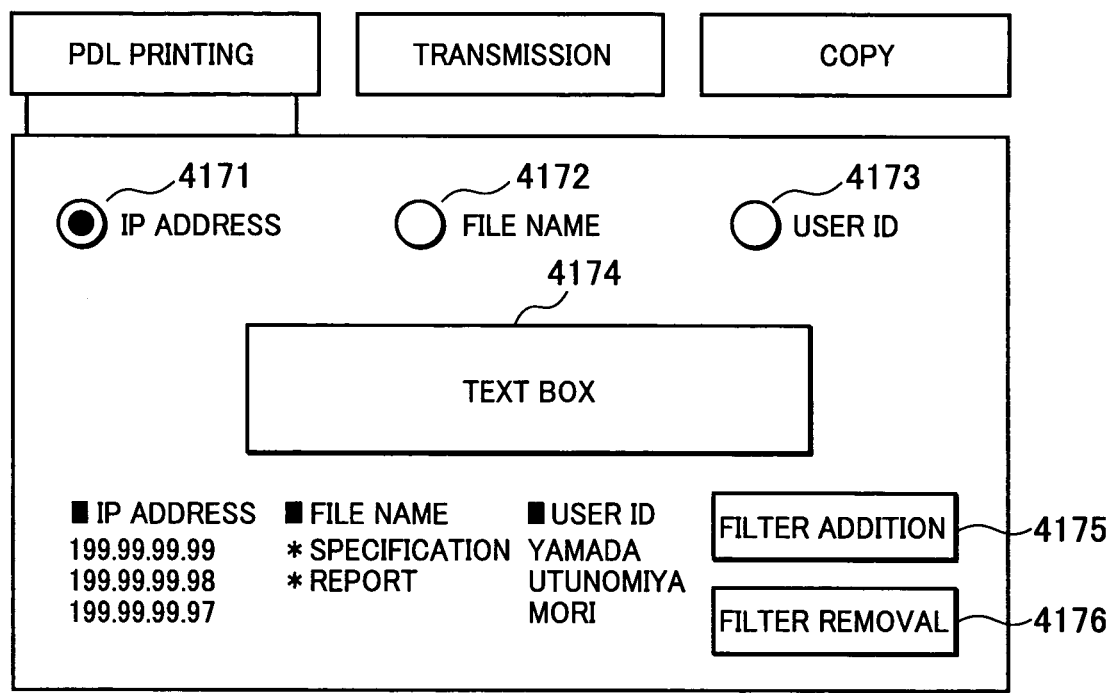
FIG. 18 is a view illustrating a dialog screen which is displayed by depressing a setting button for a PDL copy-forgery-inhibited pattern receiving condition in the screen shown in FIG. 12, according to an exemplary embodiment of the present invention.

FIG. 18 shows an exemplary dialog screen which is displayed when a PDL copy-forgery-inhibited pattern receiving condition setting button 4115 is depressed on the screen shown in FIG. 12, according to an exemplary embodiment of the present invention.

FIG. 18 shows an example of a dialog screen for determining a condition in which the copy-forgery-inhibited pattern printing is carried out when PDL is issued and which is delivered from the host PC 240.

Referring to FIG. 18, radio buttons 4171, 4172, and 4173 are provided for designating a string inputted in the text box 4174 as any one of "IP ADDRESS", "FILE NAME" and "USER ID", respectively. Further, with the use of buttons 4175, 4176, conditions for carrying out copy-forgery-inhibited pattern printing may be added or removed. An added condition is displayed in the lower part of the screen shown in this figure as a condition for carrying out copy-forgery-inhibited pattern printing.

As stated above, by the setting and using the screen shown in FIG. 18, for example, the supervisor for the printer 200 may add a copy-forgery-inhibited pattern image only to PDL data as to a particular IP address, file or user before printing the PDL data.

Next, explanation will be made of a process of creating an image added thereto with a copy-forgery-inhibited pattern image, which is carried in the printer 200.

Figure 19:
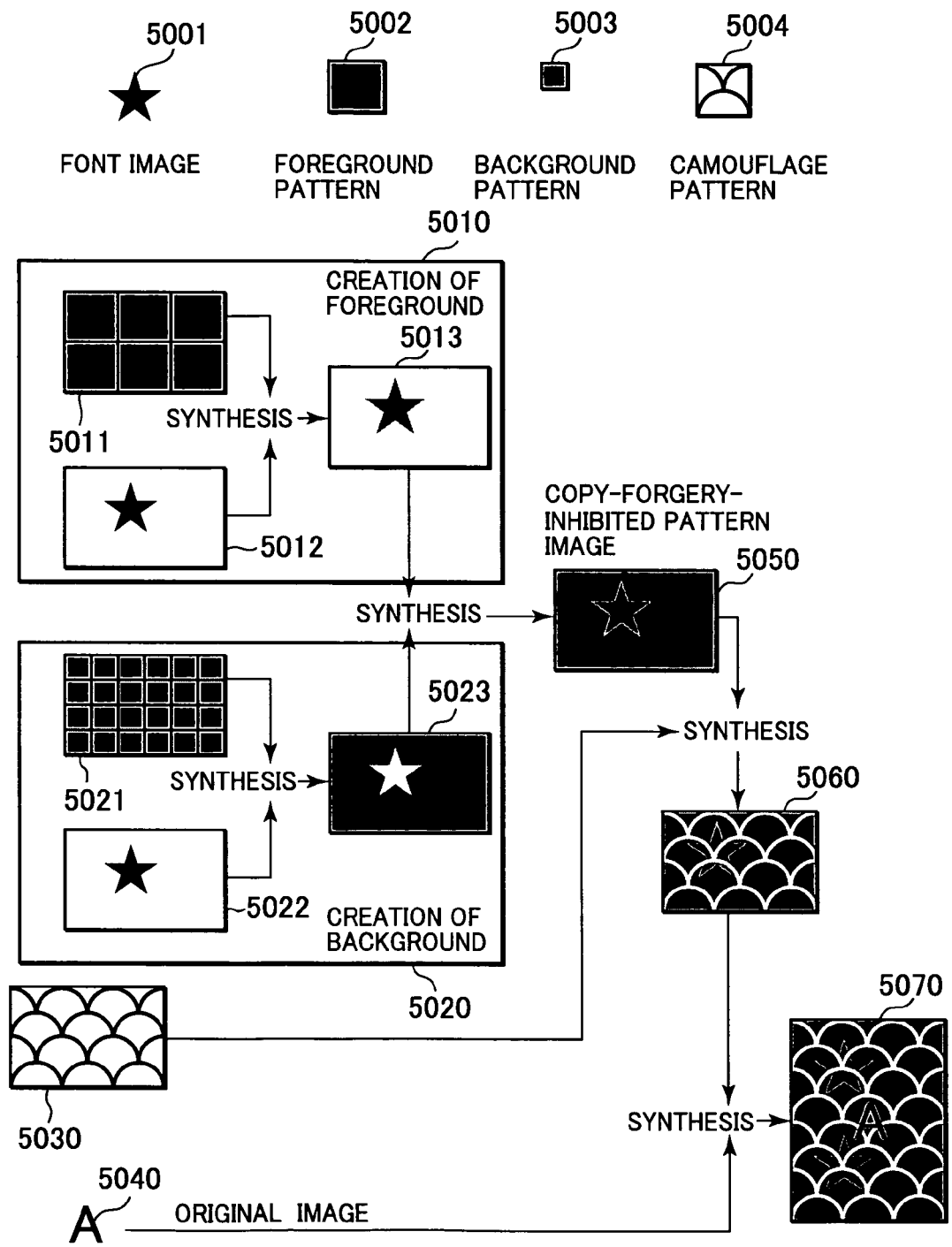
FIG. 19 is a diagram illustrating a process of creating an image which is added to a copy-forgery-inhibited pattern image in the printer, according to an exemplary embodiment of the present invention.

FIG. 19 illustrates a process of generating an image which is added to a copy-forgery-inhibited pattern image, according to an exemplary embodiment of the present invention. The printer 200 develops a bit map of the characters or a mark set in the manipulating portion 2062 as stated above, on the RAM 2002. In FIG. 19, there are shown a mark 5001 developed in the form of a bit map, and patterns 5002, 5003, 5004 used for a foreground, a background and a camouflage of a copy-forgery-inhibited pattern image, which have been generated before the synthesis of the image, on the basis of the settings that have been already explained with reference to FIG. 16. These generated patterns have been stored in the HDD 2004. Further, these patterns may be developed on the RAM 2002 with an optional size.

Further, there is shown a zone 5010 for the creation of the foreground image of the copy-forgery-inhibited pattern image. In this zone, reference numeral 5011 exhibits such a condition that a foreground pattern stored in the HDD 2004 is developed on the RAM 2002 with a predetermined number of repetitions. Reference numeral 5012 exhibits such a condition that a font of the thus set mark is developed on the RAM 2002. In this condition, a white image is added around the font in order to adjust its size to that of the image of the pattern 5011. Similarly, after the images 5011 and 5012 are developed on the RAM 2002, both images are synthesized by the synthesizing portion 2023 so as to generate a foreground image 5013 on the RAM 2002. At this time, the synthesizing process is carried out so that the pattern 5011 is left only in the character part of the mark 5012.

Further, there is shown a zone 5020 for creation of the background image of the copy-forgery-inhibited pattern image. In this zone, reference numeral 5021 exhibits such a condition that a background pattern stored in the HDD 2004 is developed on the memory with a predetermined number of repetitions. Reference numeral 5022 exhibits such a condition that a font of the thus set mark is developed on the RAM 2002. In this condition, a white image is added around the mark in order to adjust its size to that of the image of the pattern 5021. Similarly, after the images 5021 and 5022 are generated on the RAM 2002, both images are synthesized by the synthesizing portion 2023 so as to generate a background image 5023 on the RAM 2002. At this time, the synthesizing process is carried out so that the pattern 5021 is left only in a part other than the font of the image 5022.

Reference numeral 5030 exhibits a camouflage image, that is, an image which is obtained by developing the camouflage pattern 5004 on the RAM 2002. There may be possibly presented such a case that this image is not creased under instructions from the manipulating portion as stated above.

After the completion of the image creating process for the foreground image and the background image, the foreground image 5013 and the background image 5023 are simply synthesized so as to generate an image 5050 on the RAM 2002. Further, in the case of the presence of the setting for creating the camouflage image 5030, the image 5050 is further subjected to a synthesizing process so as to generate a synthesized image 5060 on the RAM 2002. At this time, the synthesis is carried out so that the camouflage image is reversed. This image is the copy-forgery-inhibited pattern image.

After the creation of the copy-forgery-inhibited pattern image, an original image 5040 and the copy-forgery-inhibited pattern image 5060 are synthesized with each other so as to generate an image 5070 with the copy-forgery-inhibited pattern on the RAM 2002.

Explanation will be hereinbelow made of a process which is carried out in the case of contention between the setting information of copy-forgery-inhibited pattern printing in the PDL and the copy-forgery-inhibited pattern information set in the printer 200 as stated above when the PDL data including a job output file stored with the data format shown in FIG. 10 is issued to the printer 200, after the host PC 240 carries out the setting of copy-forgery-inhibited pattern information with the use of the dialog as shown in FIG. 9, in the form of several embodiments of the present invention.

Embodiment 1

Figure 20:
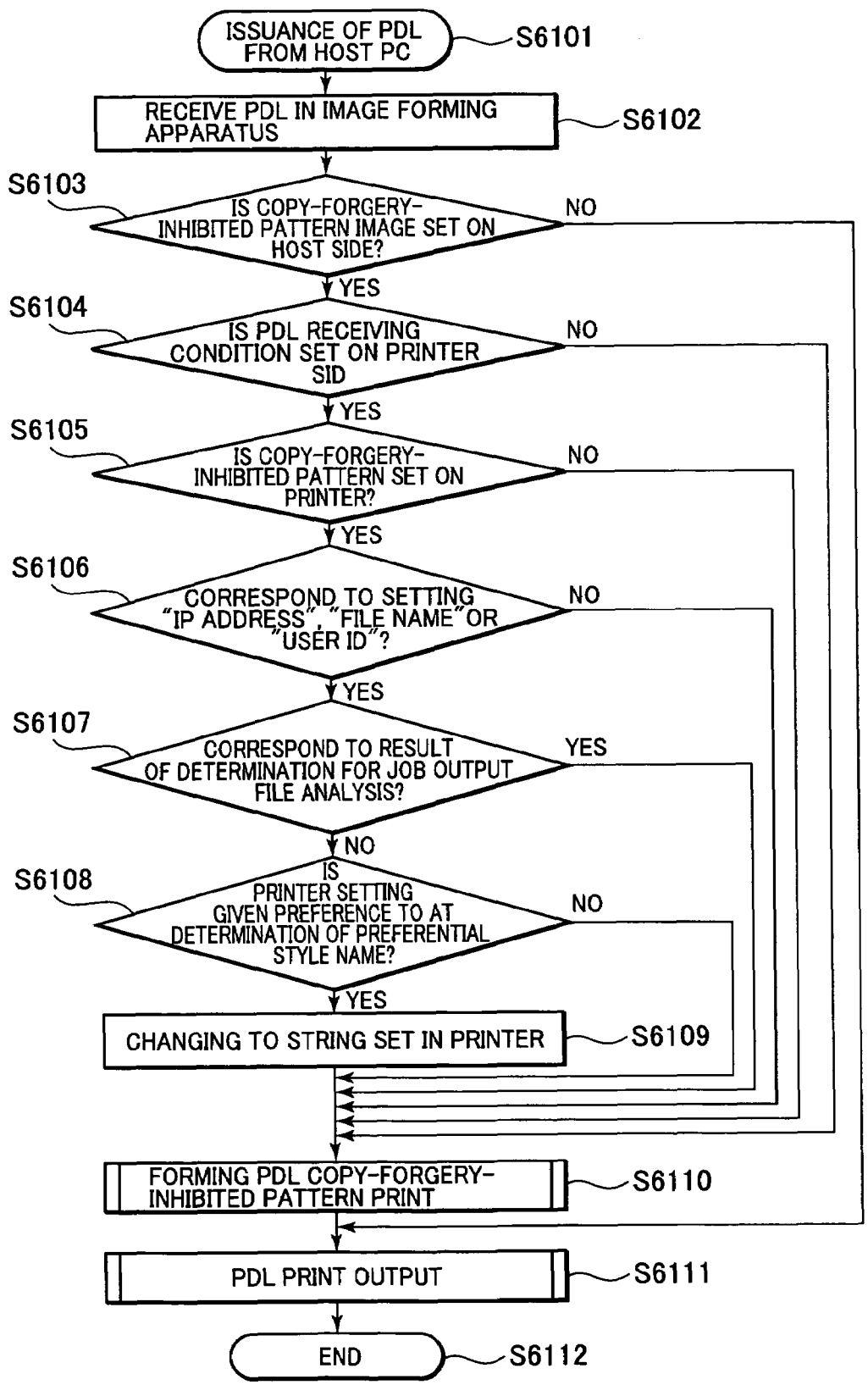
FIG. 20 is a flowchart illustrating a printing process executable by the printer according to a first embodiment of the present invention.

FIG. 20 shows a printing process carried out by the printer 200, according to a first embodiment of the present invention. In particular, the printing process illustrated in FIG. 20 is carried out in the case of contention between copy-forgery-inhibited pattern information from the host PC 240 and copy-forgery-inhibited pattern information set in the printer 200.

When a PDL data including information that instructs printing is issued from the host PC 240 to the printer 200, the process is started (S6101). This PDL data includes, as a job output file stored in the data format shown in FIG. 10, the copy-forgery-inhibited pattern information which has been set by the copy-forgery-inhibited pattern printing explained with reference to FIGS. 9A and 9B. Explanation will be hereinbelow made of the process, for example, in such a case that a string is set in the zone 2206 in the dialog 2201 shown in FIG. 9A while "COPY" is set from the style list in the zone 2202, and further, various common settings are made in the same dialog 2201. It is noted that the following process is carried out when the CPU 2001 in the MFP starts a program for executing the flowchart. That is, the following steps are determined and processed by the CPU 2001.

When PDL data is received (S6102) from the host PC 240 through the network application 4120 (Refer to FIG. 6), whether the received PDL data includes copy-forgery-inhibited pattern information or not is determined (S6103). If no copy-forgery-inhibited pattern information is included in the receive PDL data, normal PDL printing is carried out without creation of a copy-forgery-inhibited pattern image (S6111), and the process is ended (S6112).

At step S6103, if it is determined that the received PDL data includes the information of a copy-forgery-inhibited pattern image, the process proceeds to step S6104. At step S6104, it is determined whether or not any setting (copy-forgery-inhibited pattern, color balance, a monochromatic color, negative-position reversal, mirror image, scale-down layout) as to PDL printing is made on the UI panel of the printer 200. If no setting is made as to the PDL printing, an image added thereto with a copy-forgery-inhibited pattern image is formed from the PDL data including the information of a copy-forgery-inhibited pattern image set by the host PC 240 (S6110), and PDL printing is carried out based thereupon (S6111), and this process is ended (S6112).

If it is determined at step S6104 that any setting as to PDL printing is made on the UI panel shown in FIG. 11, whether the setting includes a setting relating to a copy-forgery-inhibited pattern or not is determined (S6105). If no setting relating to a copy-forgery-inhibited pattern is included, that is, if a setting (color balance, a monochromatic color, negative-positive reversal, mirror image, scale-down layout) other than the copy-forgery-inhibited pattern is set, the PDL data is edited in accordance with each of the settings, then an image added with a copy-forgery-inhibited pattern image is formed (S6110) from PDL copy-forgery-inhibited pattern information set by the host PC 240 as explained with reference to FIG. 19, and the PDL printing is carried out based thereupon (S6111). Thereafter, the process is ended (S6112).

If it is determined that the setting relating to a copy-forgery-inhibited pattern is made at step S6105, the process proceeds to step S6106. At step S6106, it is determined whether or not the PDL data from the host PC 240 relates to a particular host unit, file or user set on the printer 200 side, as stated with reference to FIG. 18. Specifically, it is determined (S6106) whether "IP ADDRESS" set on the UI shown in FIG. 18 corresponds to the one belonging to the host PC 240 or not, whether the similarly set "FILE NAME" corresponds to a file name transmitted in the form of PDL data or not, and the similarly set "USER ID" corresponds to a user ID with which the PDL data is transmitted or not. The determination and process steps are carried out by the PDL application 4023 (FIG. 6). It is noted that the determination at this step is, of course, not always made for all of "IP ADDRESS", "FILE NAME" and "USER ID". That is, the determination is made only for items set on the UI shown in FIG. 18. If, for example, any one of items is not set, it is deemed that this determination does not correspond to any of the above-mentioned items, and step S6110 which will be explained later is carried out.

With the above-mentioned step S6106, the contention between the information of a copy-forgery-inhibited pattern image designated by the host PC 240 and the information of a copy-forgery-inhibited pattern image set in the printer 200 by itself is determined only for the PDL data relating to a particular IP address or the like, as will be explained latter. Further, in the case of the presence of the contention, an appropriate process is carried, depending on the above-mentioned particular item. Thus, for example, the supervisor for the printer 200 may specify an IP address or the like of the host unit by which the printing is made, and in the case of copy-forgery-inhibited pattern printing therefrom, he/she may cause the host unit to print a copy-forgery-inhibited pattern image set in the printer 200 by itself. As a result, in the case of printing from a particular host, a copy-forgery-inhibited pattern image having been previously set by the supervisor may be added to the document. Also, in the case of printing a document having a particular file name, a copy-forgery-inhibited pattern image having been previously set by the supervisor may be added to the document. Also, in the case of printing a document by a particular user, a copy-forgery-inhibited pattern image having been previously set by the supervisor may be added to the document.

It is noted that embodiments of the present invention should not be, of course, limited to such an application that the contention of information of copy-forgery-inhibited pattern images is determined, being exclusive to a specific IP address. For example, it may be also applied to such a configuration that the contention of information of copy-forgery-inhibited pattern images is determined for all PDL data transmitted to the printer 200. Further, it is not always required to execute filtering (step S6106) in the above-mentioned embodiment in accordance with the information of a copy-forgery-inhibited pattern image transmitted from the host PC. The determination may be made in view of an IP address or a user name transmitted from the host PC, in addition to the information of a copy-forgery-inhibited pattern image.

As a result of determination at step S6106, if it does not correspond to information set on the UI shown in FIG. 18, a copy-forgery-inhibited pattern image is generated from PDL copy-forgery-inhibited pattern information set in the host PC 240. Further, a process for synthesizing the thus formed copy-forgery-inhibited pattern image with original data transmitted through PDL is carried out (S6110). In this case, as an example, a document added thereto with a copy-forgery-inhibited pattern image of a style name "COPY" set in the host PC 240 is outputted (S6111).

If determination is made that it corresponds to information set on the UI shown in FIG. 18 at step S6106, the content of the job output file included in the PDL is analyzed and determined by the PDL manager 4070 (S6107). Specifically, whether the "string" in the data file 2002 in the received PDL corresponds to a string set on the UI of the printer 200 shown in FIG. 13 or not is determined. If the stings correspond to each other by the determination at step S6107, a copy-forgery-inhibited pattern image is generated at step S6110. Further, a process for synthesizing the generated copy-forgery-inhibited pattern image with original data transmitted through PDL is carried out (S6101). Specifically, an image is generated from the received PDL, and the image generated from the PDL is synthesized with a generated copy-forgery-inhibited pattern image. Next, the synthesized image is transmitted to the printer 2095 which prints the transmitted image. Thus, a document in which the copy-forgery-inhibited pattern of the style name "COPY" is printed is outputted (S6111), and a series of PDL printing process steps is completed (S6112). That is, since the string of the copy-forgery-inhibited pattern image set in the host PC coincides with the string of the copy-forgery-inhibited pattern image set in the MFP, it may be assumed that a copy-forgery-inhibited pattern desired by the user who has set a copy-forgery-inhibited pattern image in the host PC is the same as that owned by the supervisor for the MFP.

Figure 22:
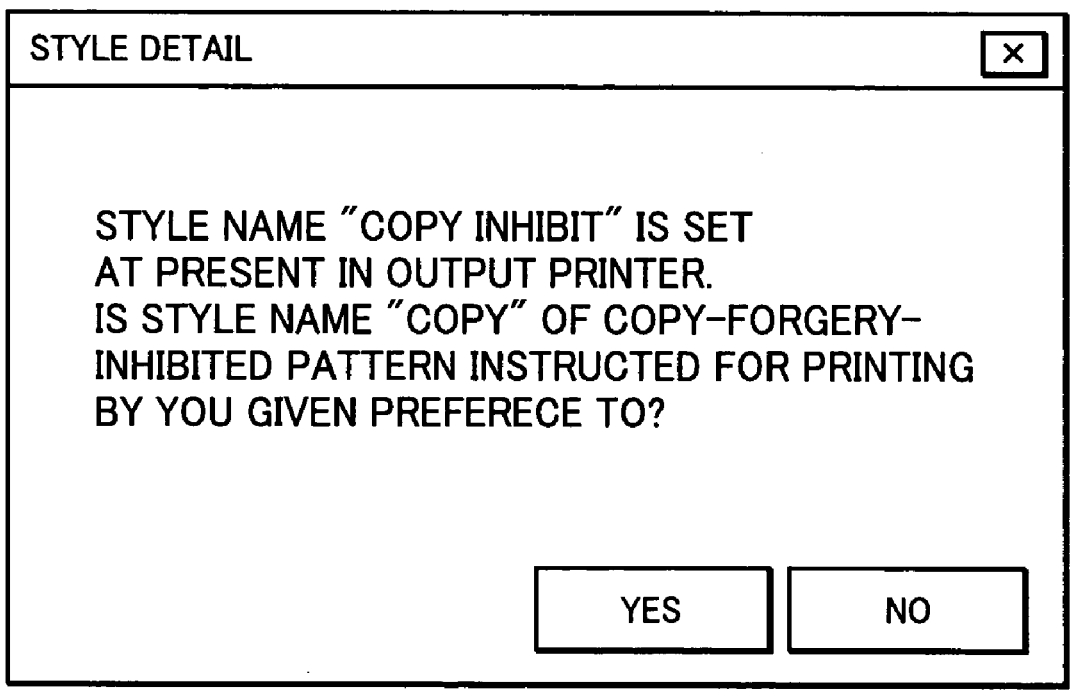
FIG. 22 is a view illustrating an exemplary dialog screen which is displayed if strings in copy-forgery-inhibited pattern images of the host unit and the printer do not coincide with each other.

On the contrary, on the printer 200 side, for example, "COPY INHIBIT" has been set on the UI shown in FIG. 13, and accordingly, if the strings do not coincide with each other as a result of determination at step S6107, an indication shown in FIG. 21 is made on the UI screen in the manipulating portion of the printer 200. Accordingly, a similar confirmation dialog shown in FIG. 22 is also displayed on the display portion in the host PC 240. Thus, the user is allowed to select whether the setting on the host PC 240 side is given preference to or the setting on the printer 240 side is given preference to. It is noted that the above-mentioned display for the user may be made only on either the printer side or the host PC side. Further, as to the content displayed for the user, there may be displayed a content which indicates that the user is forced to select the printer side, that is, for example, "In the printing of this file, "COPY INHIBIT" set in the printer is designated . . . ." may be displayed.

At step S6108, if it is determined that the setting on the printer 200 is given preference to, change is made such that the file name "COPY" in the PDL date is not used but the "COPY INHIBIT" set in the printer 200 is used (S6109). As to the process for this change, there may be used such a process that the field of the information of a copy-forgery-inhibited pattern image transmitted from the host PC is not only overwritten but also replaced with a string set in the MFP. Further, there may be used another changing process. At this time, it may be further determined whether settings for those (color, angle or the like) other than a string set in the dialog in the host PC is used or a condition set in an image forming apparatus is used. Meanwhile, if it is determined that the setting of the information of a copy-forgery-inhibited pattern image in the host PC 240 is given preference to at step S6108, an image added thereto with a copy-forgery-inhibited pattern image depending on the information is generated (S6110), and a document with the copy-forgery-inhibited pattern image of the style name "COPY" being printed is outputted (S6111).

It is noted that if it is determined that no information of a copy-forgery-inhibited pattern image is set in the host unit at step S6103, and if a setting is made on the printer side by itself in relation to the PDL data through the intermediary of the UI shown in FIG. 11, a printing process according to the setting is carried out including the addition of a copy-forgery-inhibited pattern image, in the PDL printing process at step S6111. Thus, there may be carried out such a printing process that an image to be printed is added thereto with a copy-forgery-inhibited pattern image on the printer side itself. In this case, the above-mentioned process may be also carried out, exclusive to PDL data relating to a specific IP address set on the UI shown in FIG. 18.

Embodiment 2

In a second embodiment of the present invention, the setting in the printer is given preference to in the case of contention between copy-forgery-inhibited pattern images which are set respectively in the host PC 240 and the printer 200.

Figure 23:
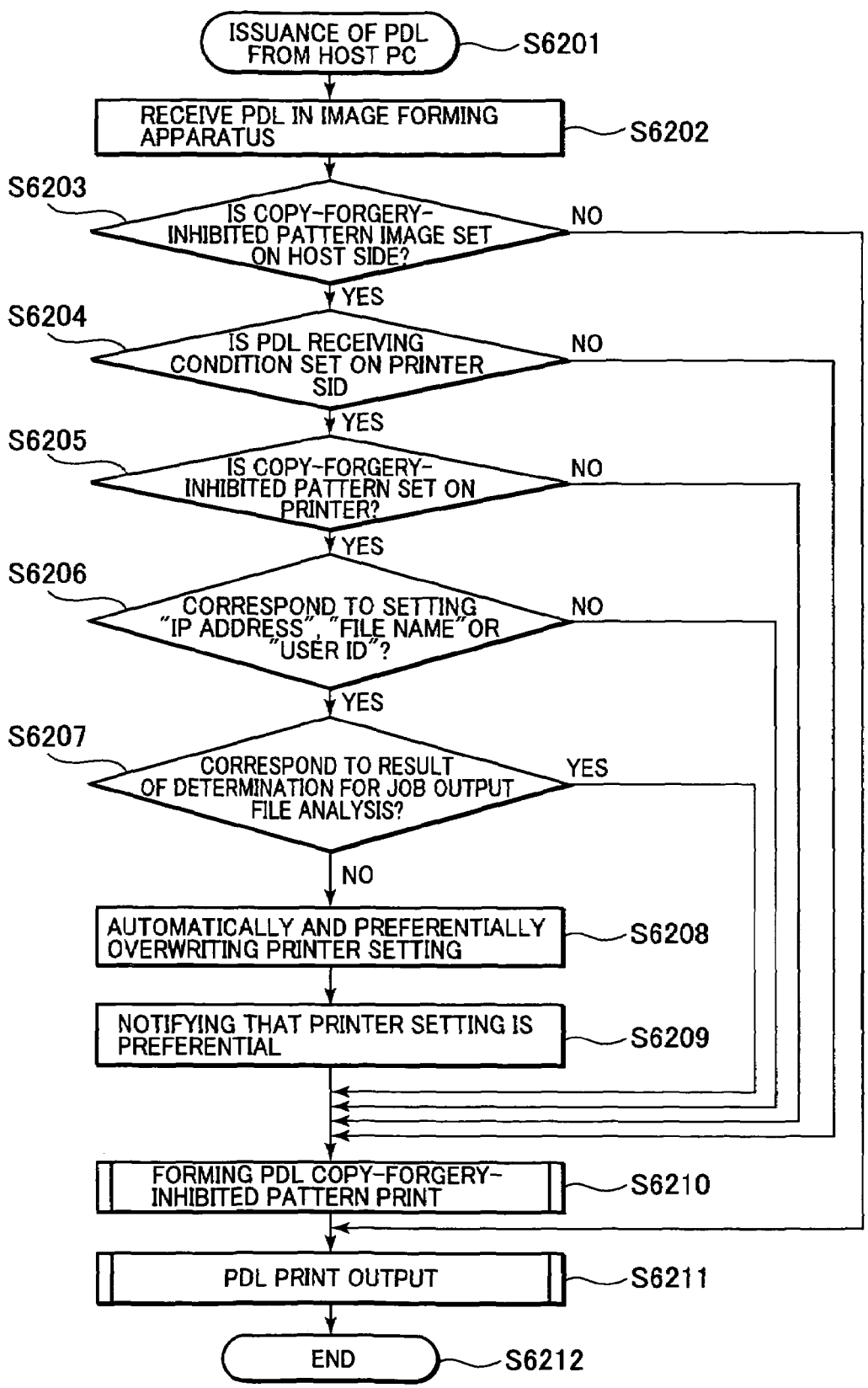
FIG. 23 is a flowchart illustrating a printing process executable by the printer according to a second embodiment of the present invention.

FIG. 23 shows a printing process executable by the printer 200, according to the second embodiment of the present invention. The printing process illustrated in FIG. 23 is similar to the process in the first embodiment of the present invention. Explanation will be hereinbelow made of, in particular, features of the second embodiment of the printing process, which are different from those of the first embodiment.

If it is determined at step S6207 that the style name of the copy-forgery-inhibited pattern image set in the host PC 240 does not coincide with the style name set in the printer 200, the information of the copy-forgery-inhibited pattern image set in the printer 200 is automatically selected preferentially in this embodiment. Further, the style name "COPY" in the job output file stored in a data format shown in FIG. 10 is overwritten with "COPY INHIBIT" set in the printer 200 (S6208). At this time, various common settings set in the dialog 2201 in the host PC 240 are also overwritten with setting information in the image forming apparatus. Next, the host PC 240 is informed of such a notice that the setting on the printer side is given preference to (S6209). Further, in an image added thereto with a copy-forgery-inhibited pattern image of "COPY INHIBIT" set in the printer 200 is generated (S6210), and then the printing is carried out based thereon (S6211).

Thus, in this embodiment, the copy-forgery-inhibited pattern image set on the printer side is automatically applied preferentially, and accordingly, for example, the supervisor for the printer may facilitate the management relating to the copy-forgery-inhibited pattern printing.

Embodiment 3

In a third embodiment of the present invention, a printing job base upon PDL data from the host PC 240 is cancelled in the case of contention between copy-forgery-inhibited pattern images which are set respectively in the host PC 240 and the printer 200.

Figure 24:
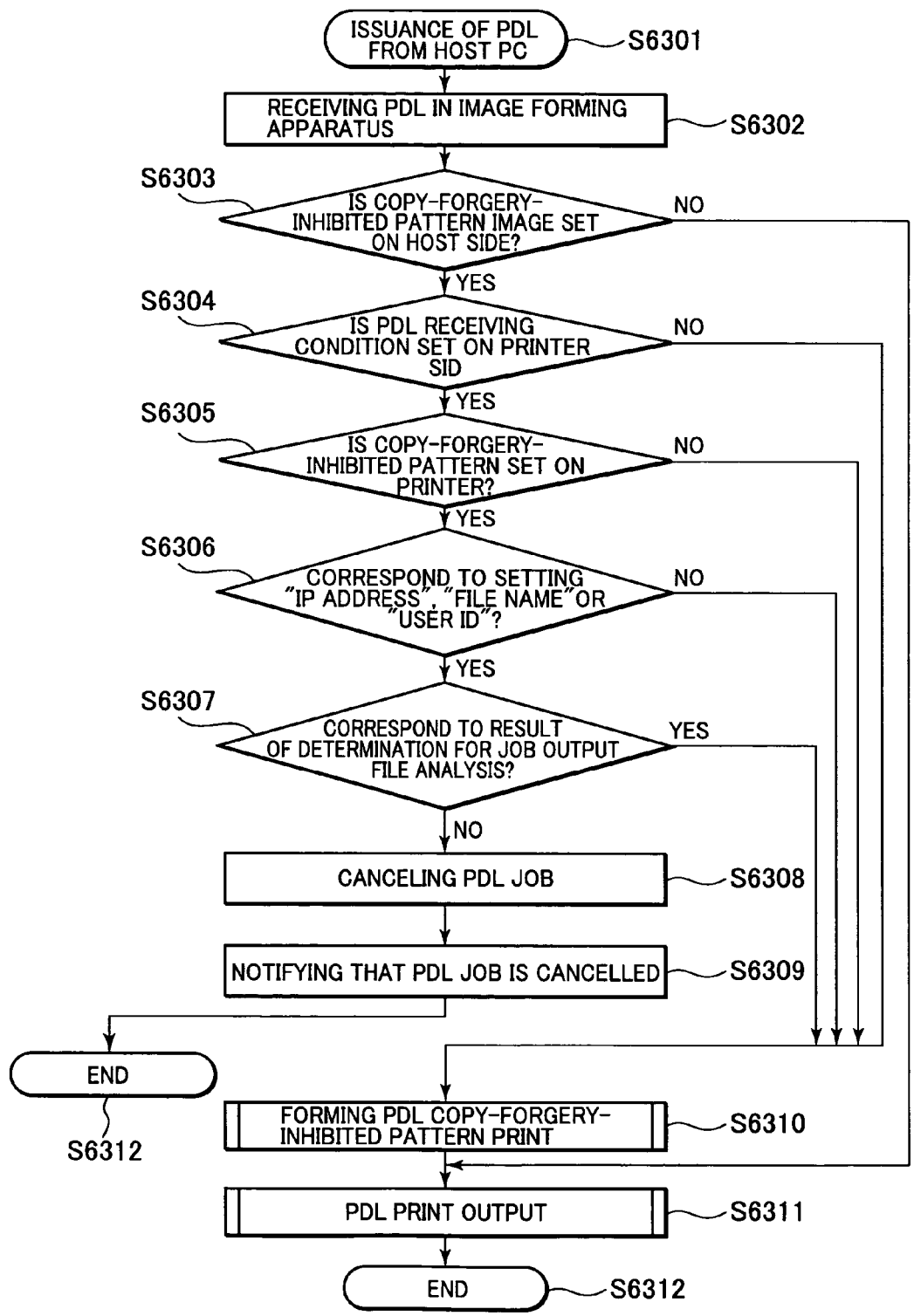
FIG. 24 is a flowchart illustrating a printing process executable by the printer according to a third embodiment of the present invention.

FIG. 24 shows a printing process according to the third embodiment. Explanation will be made of process steps other than those which are common to the first and second embodiments.

If it is determined at step S6307 that a style name of a copy-forgery-inhibited pattern image set in the host PC 240 does not coincide with a style name set in the printer 200, PDL data is cancelled by the job manager 4040 in the printer (S6308). Next, the host PC 240 is informed of such a notice that PDL data is cancelled, including a content of a position where the settings are not coincident with each other (S6309), and the process is ended without printing being made (S6312).

In this embodiment, if the host unit 240 transmits PDL data in which information of copy-forgery-inhibited patterns is not coincident, the printing itself may not be made, and accordingly, there may be effected such a strong enforcement that the user for the host PC 240 follows the settings on the printer side with respect to the setting of a copy-forgery-inhibited pattern image.

Embodiment 4

In a fourth embodiment of the present invention, in the case of contention between copy-forgery-inhibited patterns images which are set respectively in the host PC 240 and the printer 200, these copy-forgery-inhibited pattern images are synthesized and are added to the image.

Figure 25:
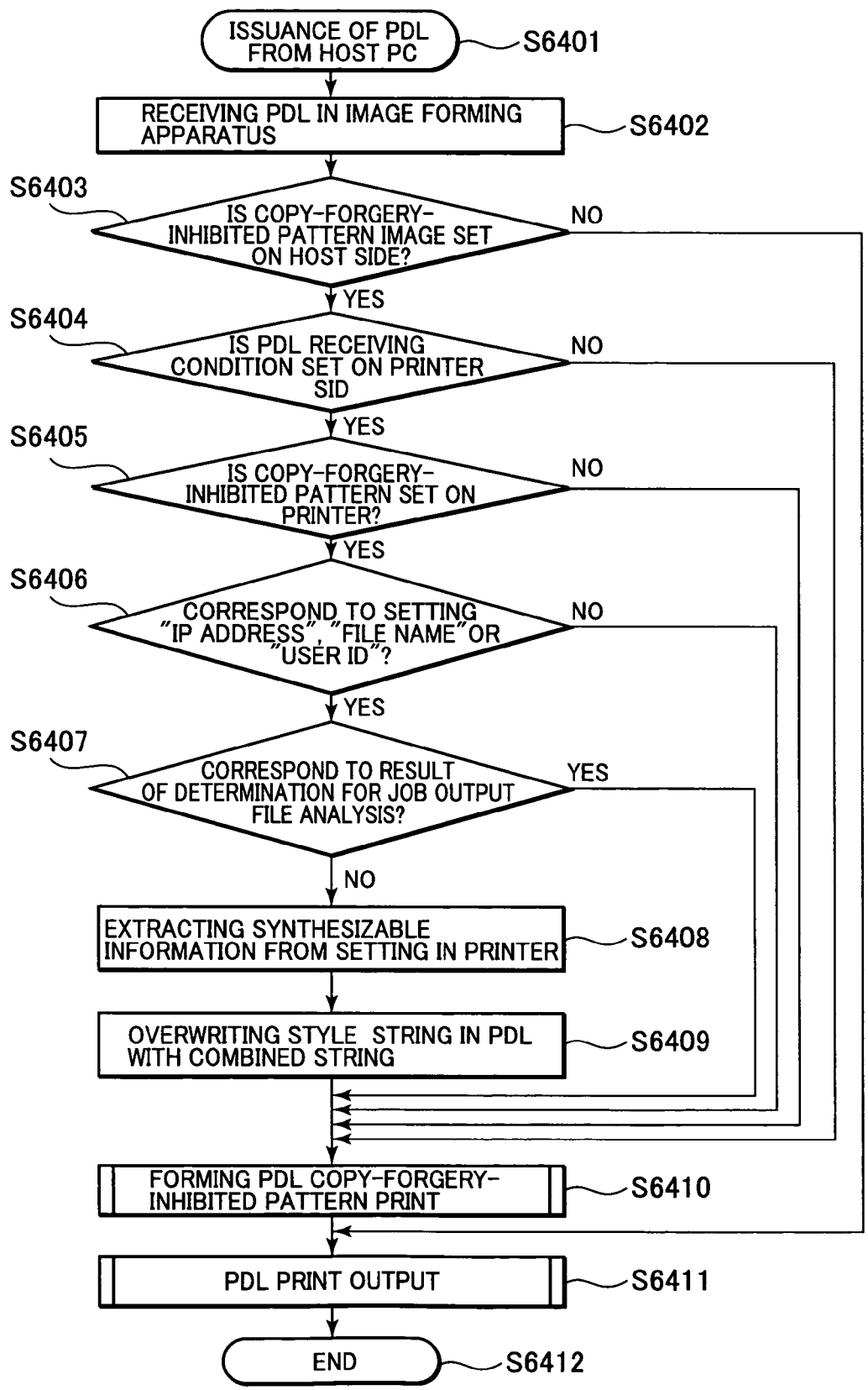
FIG. 25 is a flowchart illustrating a printing process executable by the printer according to a fourth embodiment of the present invention.
Figure 26:
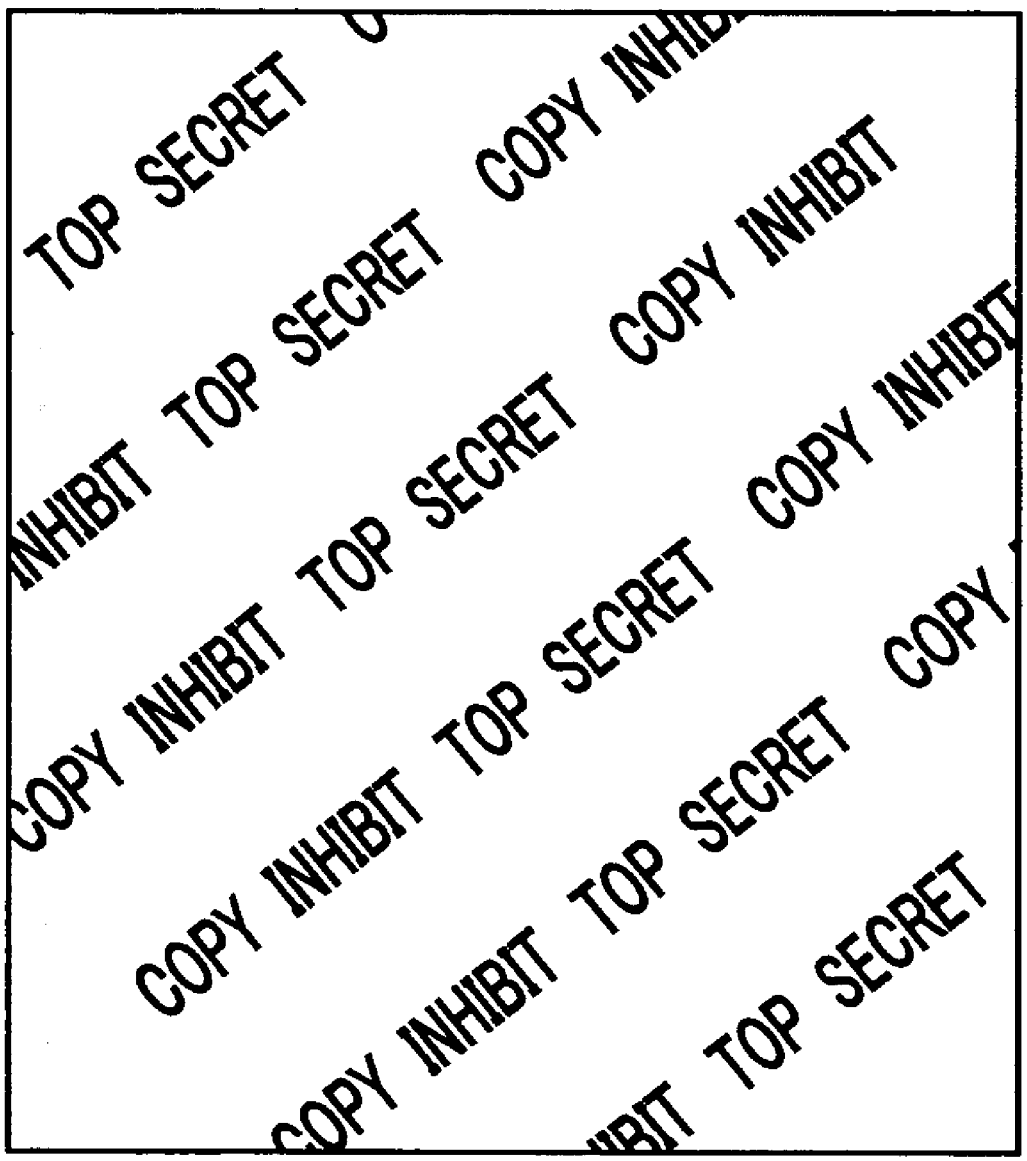
FIG. 26 is a view illustrating a copy-forgery-inhibited pattern image in which two styles having style names "COPY INHIBIT" and "TOP SECRET" are synthesized, according to the fourth embodiment of the present invention.

FIG. 25 shows a printing process according to the fourth embodiment of the present invention. Explanation will be made of, in particular, processing operations that are not common to the first, second and third embodiments.

If it is determined at step S6407 that the style name of the copy-forgery-inhibited pattern image set in the host PC 240 does not coincide with the copy-forgery-inhibited pattern image set in the printer 200, information which can be synthesized is extracted from the copy-forgery-inhibited pattern image set in the printer 200. As an example, assume that string information having a style name "TOP SECRET" is extracted as information that can be synthesized (S6408). Further, assume that data having the style name "COPY INHIBIT" in the job output file which is repeatedly drawn and stored in a data format shown in FIG. 10 is overwritten on string data which is combined as "COPY INHIBIT TOP SECRET" (S6409). The order of strings to be combined and the arrangement of respective strings may be of course optional, that is, any order or any arrangement may be employed. Next, an image added thereto with the copy-forgery-inhibited pattern image explained with reference to FIG. 19 is generated (S6410), and an image such as a document added thereto with the copy-forgery-inhibited pattern image in which both style names "COPY INHIBIT" and "TOP SECRET" are combined with each other, is outputted (S6411). At this time, as to a color, an angle, a font side and the like of the copy-forgery-inhibited pattern image, whether those set in the host PC are applied or those set in the printer are applied may be optionally selected by the user. Alternatively, the copy-forgery-inhibited pattern image may be generated with the use of either one of the information settings in view of the process steps in the above-mentioned embodiments. The essential feature of the fourth embodiment is the use of both string transmitted from the host PC and string set in the printer in the case of difference between both strings.

Thus, according to this embodiment, although a copy-forgery-inhibited pattern image the user of the host unit does not intend using is added, this image becomes visible upon duplication, and since a copy-forgery-inhibited pattern image set in the host PC is also added in part, the user may accept this synthesis in a relatively convenient manner.

Embodiment 5

In the fifth embodiment of the present invention, a copy-forgery-inhibited pattern image set in the host PC is preferentially used in the case of the contention between copy-forgery-inhibited pattern images which are set respectively in the host PC 240 and the printer 200.

Figure 27:
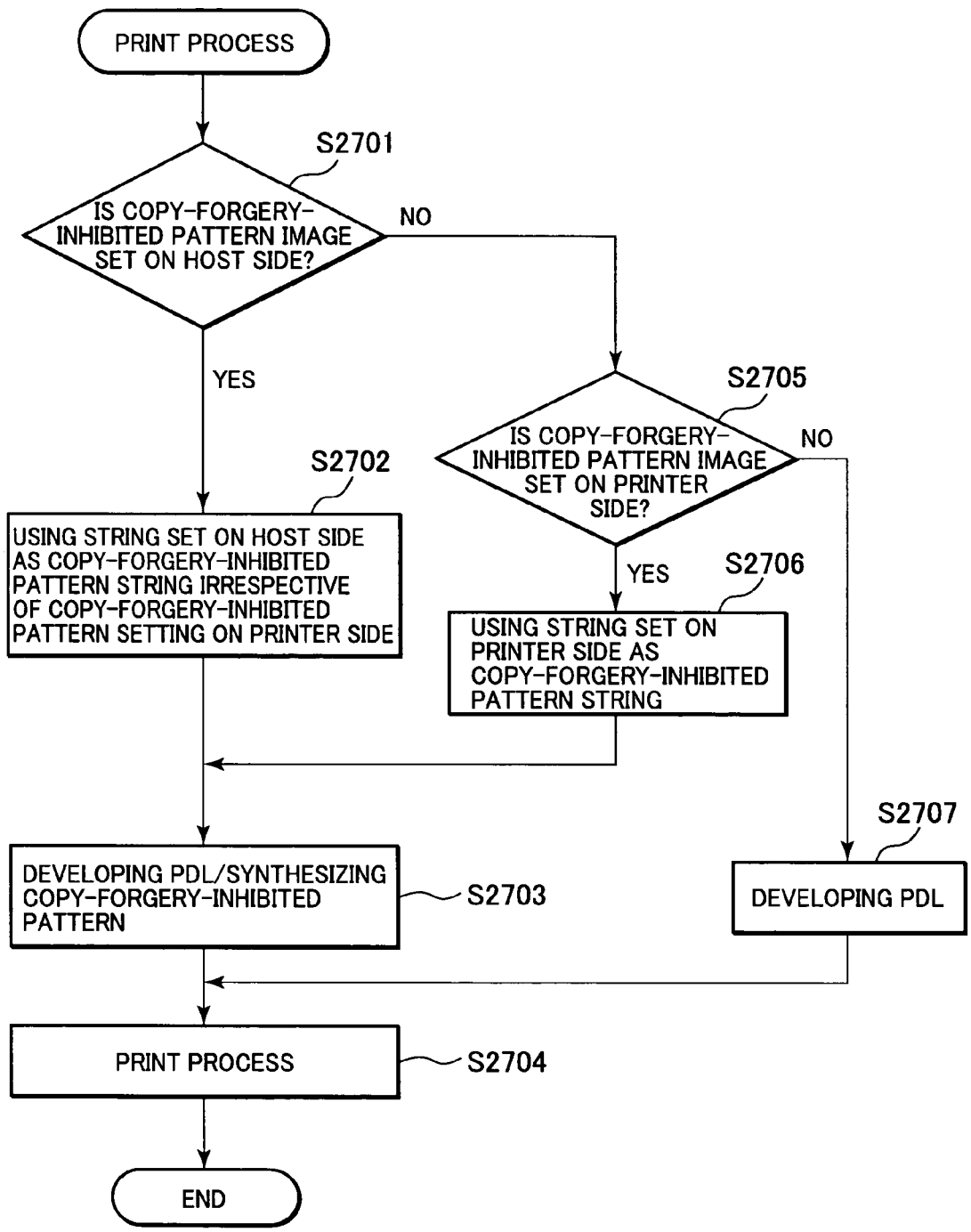
FIG. 27 is a flowchart illustrating a printing process executable by the printer according to a fifth embodiment of the present invention.

FIG. 27 shows a printing process according to the fifth embodiment of the present invention. It is noted that a program relating to the flowchart shown in FIG. 27 is stored in a ROM 2003 and is executed by the CPU 2001 of the printer 200.

At step S2701, whether a host side copy-forgery-inhibited pattern is set by the host side driver or not is determined based on PDL received from the host PC 240. If it is determined at step S2701 that the host side copy-forgery-inhibited pattern is set, step S2702 is carried out. At step S2702, a string set on the host side is used as a copy-forgery-inhibited pattern string, irrespective of whether or not a printer copy-forgery-inhibited pattern is set on the panel on the printer side. At next step S2703, an image based on received PDL is synthesized to the copy-forgery-inhibited pattern image set in the host. At next step S2704, the image synthesized at step 2703 is transmitted to the printer 2095 which therefore prints the image.

If it is determined at step S2701 that no host copy-forgery-inhibited pattern is set, the process proceeds to step S2705. At step S2705, it is determined whether or not a printer copy-forgery-inhibited pattern is set on the panel on the printer side as shown in FIGS. 11 to 16. If it is determined at step S2705 that a printer copy-forgery-inhibited pattern is set on the panel on the printer side as shown in FIGS. 11 to 16, the process proceeds to step S2706. At step S2706, a string set on the printer side is used as a copy-forgery-inhibited pattern string. At next step S2703, an image based on received PDL is synthesized to the copy-forgery-inhibited pattern image set in the printer. At next step S2704, the image synthesized at step 2703 is transmitted to the printer 2095 that therefore, prints the image.

If it is determined at step S2705 that no printer copy-forgery-inhibited pattern is set on the printer side as shown in FIGS. 11 to 16, at step S2707, an image based on received PDL is generated. Next at step S2704, the image generated at step S2707 is transmitted to the printer 2095 which therefore prints the image.

Embodiment 6

In the sixth embodiment of the present invention, a copy-forgery-inhibited pattern image set in the host PC 240 is preferentially added in the case of contention between the copy-forgery-inhibited pattern images which are set respectively in the host PC 240 and the printer.

Figure 28:
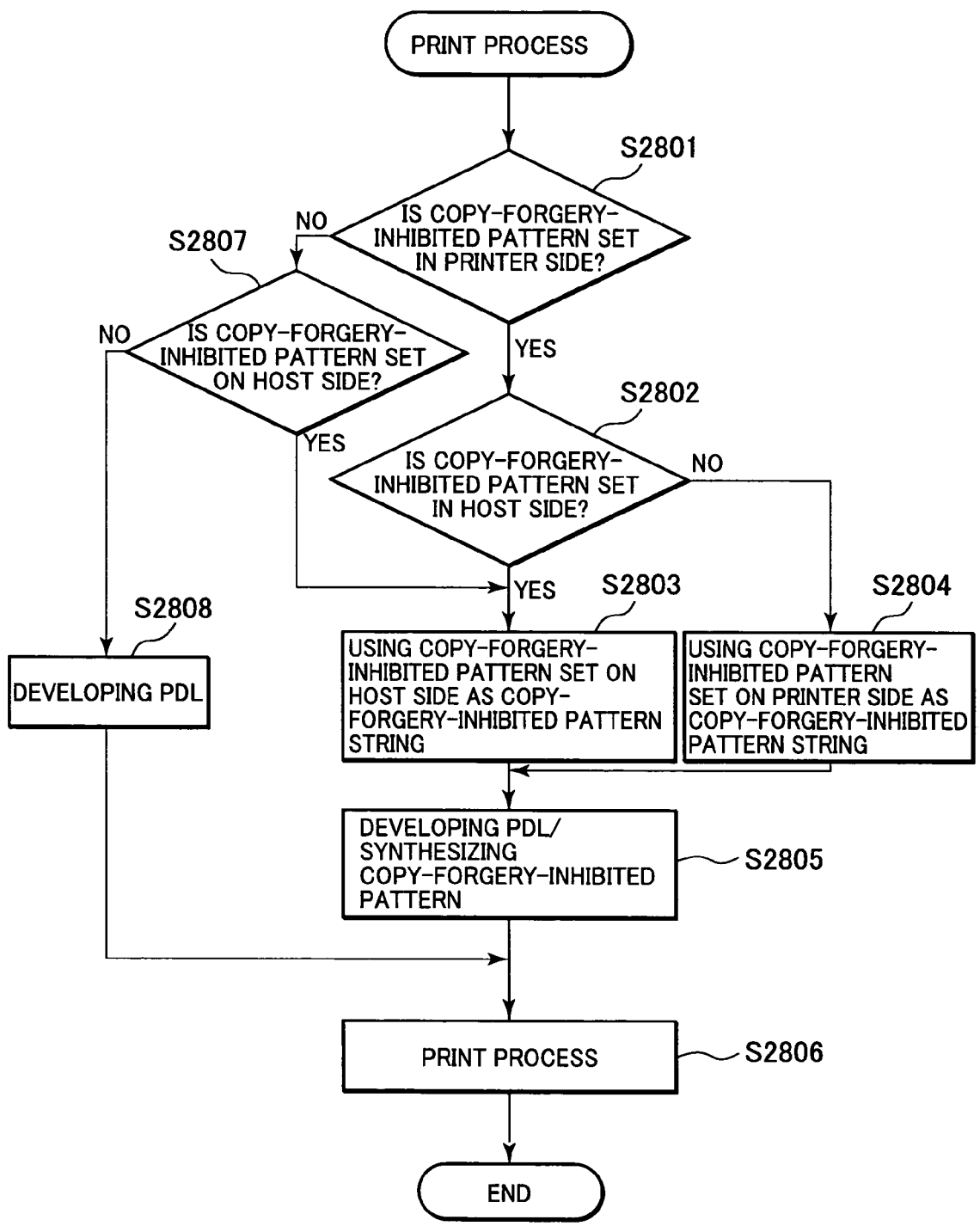
FIG. 28 is a flowchart illustrating a printing process executable by the printer according to a sixth embodiment of the present invention.

FIG. 28 shows a printing process according to the sixth embodiment of the present invention. It is noted a program relating to the flowchart shown in FIG. 28 is stored in the ROM 2003 and is carried out by the printer 200.

At step S2801, it is determined whether or not a printer copy-forgery-inhibited pattern is set on the panel on the printer side as shown in FIGS. 11 to 16. If it is determined at step S2801 that the printer copy-forgery-inhibited pattern is set on the panel on the printer side, step S2802 is carried out. At step S2802, it is determined whether or not a host copy-forgery-inhibited pattern is set on the driver on the host side, based on received PDL. If it is determined at step S2802 that the host copy-forgery-inhibited pattern is set on the host side, the process proceeds to step S2803. At step S2803, a string set on the host side is used as a copy-forgery-inhibited pattern string, irrespective of whether the printer copy-forgery-inhibited pattern is set or not. At next step S2805, an image generated based on the received PDL and the copy-forgery-inhibited pattern image set in the host are synthesized with each other. Then, at next step S2806, the image synthesized at step S2805 is transmitted to the printer 2095 which therefore prints the image.

If it is determined at step S2802 that no copy-forgery-inhibited pattern is set on the host side, step S2804 is carried out. At step S2804, the process uses a string set on the panel on the printer side as shown in FIGS. 11 to 16, as a copy-forgery-inhibited pattern string. At next step S2805, an image based on the received PDL is synthesized to the copy-forgery-inhibited pattern image set in the printer. At next step S2806, the image synthesized at step S2805 is transmitted to the printer 2095 that therefore prints the image.

If it is determined at step S2801 that no printer copy-forgery-inhibited pattern is set, the process proceeds to step S2807. At step S2807, it is determined whether or not a host copy-forgery-inhibited pattern is set by the driver on the host side based on the received PDL. If it is determined at step S2807 that the host copy-forgery-inhibited pattern is set, step 2803 is carried out. On the other hand, if it is determined at step S2807 that no host copy-forgery-inhibited pattern is set, step S2808 is carried out. At step S2808, an image is generated based on the received PDL. At next step S2806, the image generated at step S2808 is transmitted to the printer 2095 that therefore, prints the image.

Embodiment 7

In a seventh embodiment of the present invention, there is used a box function such that image data including a copy-forgery-inhibited pattern into which PDL (a print job) with a copy-forgery-inhibited pattern, received from the host PC 240 is developed, is stored with its file name in the hard disc drive 2004 in the printer. Thereafter the image data with the copy-forgery-inhibited pattern is read from the hard disc drive 2004 by designating the file name, and the read-out image data including the copy-forgery-inhibited pattern is printed. Specifically, on printing of the image data including the copy-forgery-inhibited pattern image, stored in the hard disc drive 2004, if the copy-forgery-inhibited pattern image contends with a copy-forgery-inhibited pattern set in the printer 200, the copy-forgery-inhibited pattern set in the host PC 240 is preferentially added.

Figure 29:
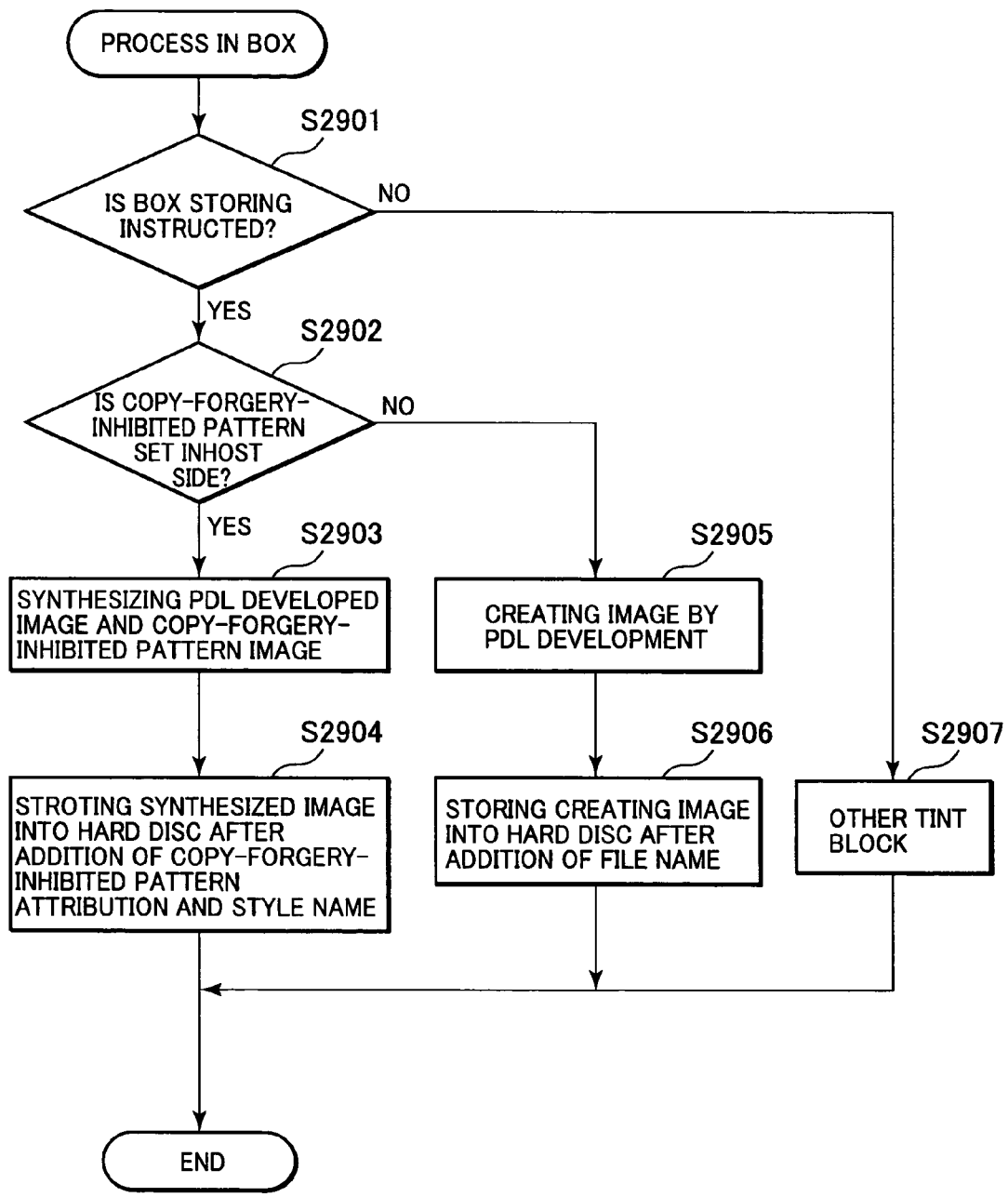
FIG. 29 is a flowchart illustrating a box storing process according to an exemplary embodiment of the present invention.

FIG. 29 shows a box storing process according to an exemplary embodiment of the present invention. In the box storing process, PDL (a printing job) received from the host is developed into image data that is then stored in the hard disc drive 2004.

It is noted that a program relating to the flowchart shown in FIG. 29 is carried out by the CPU 2001 of the printer 200.

At step S2901, it is determined whether or not box storing is designated in PDL received from the host. If it is determined at step S2901 that the box storing is designated, the process proceeds to step S2902. At step S2902, it is determined whether or not a host copy-forgery-inhibited pattern is set on the driver in the host. If it is determined at step S2902 that the host copy-forgery-inhibited pattern is set, the process proceeds to S2903. At step S2903, image date is generated based on the received PDL, and the generated image data is synthesized to copy-forgery-inhibited pattern image data set on the driver of the host. At next step S2904, the synthesized image is added thereto with a copy-forgery-inhibited pattern attribute and a file name, and is stored in the hard disc drive 2004.

If it is determined at step S2902 that no host copy-forgery-inhibited pattern is set, the process proceeds to step S2905. At step S2905, image data is generated based on the received PDL. At next step S2906, the generated image data is added thereto with an attribute and a file name, and then is stored in the hard disc drive 2004.

If it is determined at step S2901 that no box storing is designated, the process proceeds to step S2907. At step S2907, the received PDL is printed, and the other processes are also carried out.

Figure 30:
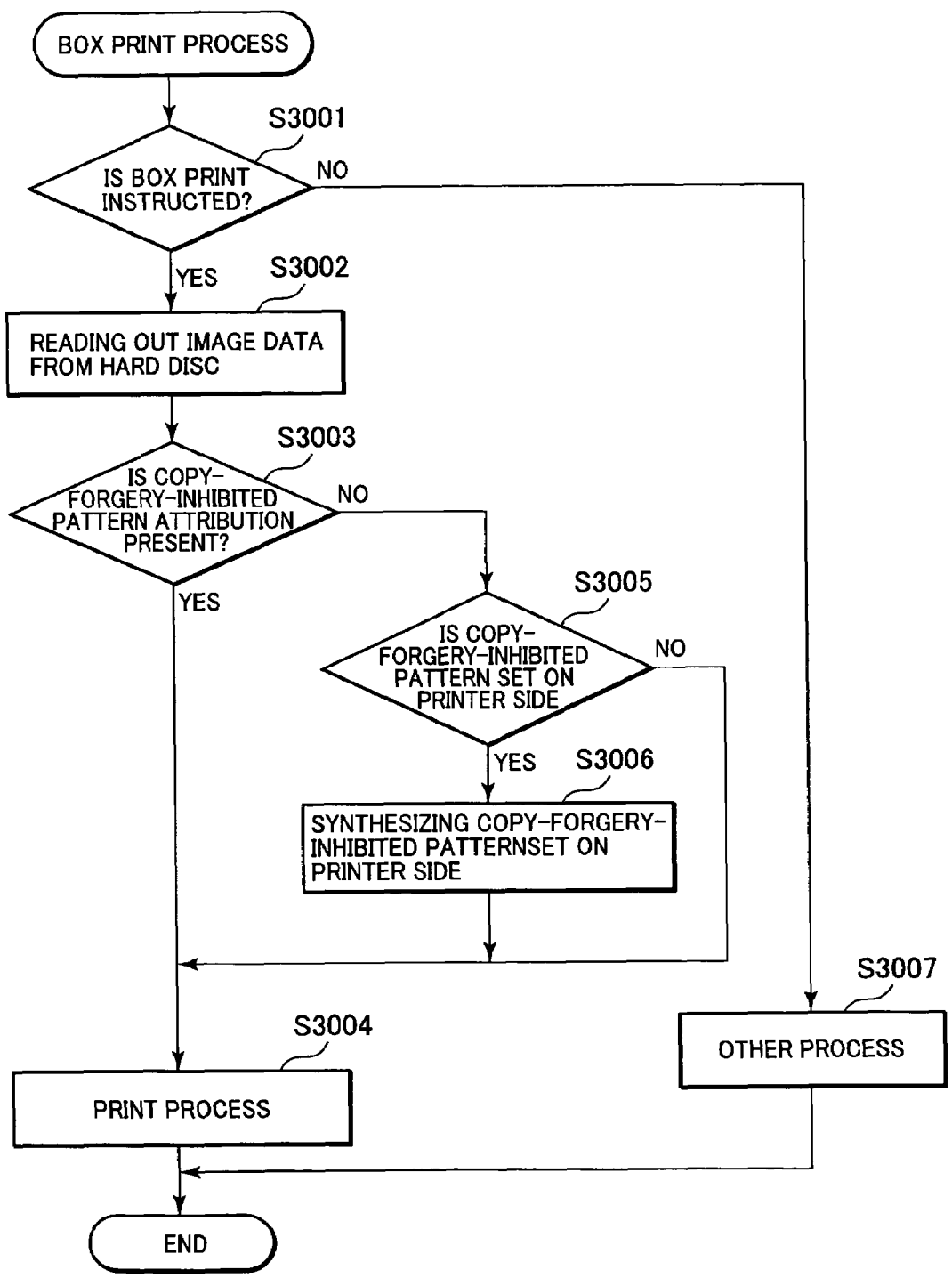
FIG. 30 is a flowchart illustrating a box printing process according to an exemplary embodiment of the present invention.

Next, referring to FIG. 30, explanation will be made of a box printing process for printing an image stored in the hard disc drive with the use of the box storing process shown in FIG. 29.

At step S3001, it is determined whether or not a box print designation is inputted based upon the box button 3103 shown in FIGS. 4 and 5. If it is determined that the box print designation is inputted, at step S3002, image data having a designated file name is read out from the hard disc drive. At next step S3003, it is determined whether or not the read-out image data is added thereto with a copy-forgery-inhibited pattern attribute. If it is determined that the copy-forgery-inhibited pattern attribute is added, the process proceeds to step S3004. At step S3004, the image data read out at step S3002 is transmitted to the printer 2905 which therefore prints the image data, irrespective whether a copy-forgery-inhibited pattern is set in the printer or not. If it is determined at step S3003 that no copy-forgery-inhibited pattern attribute is added, the process proceeds to step S3005. At step S3005, it is determined whether or not a copy-forgery-inhibited pattern is set in the printer. If it is determined at step S3005 that no copy-forgery-inhibited pattern is set in the printer, the process proceeds to step S3004. At step S3004, the image data read out at step S3002 is transmitted to the printer 2095 that therefore, prints the image data.

If it is determined at step S3005 that a copy-forgery-inhibited pattern is set in the printer, the process proceeds to step S3006. At step S3006, the image data read out at step S3002 is synthesized to the copy-forgery-inhibited pattern set in the printer, and the thus synthesized image data is transmitted to the printer 2095 that therefore, prints the synthesized image data.

It is noted that although the copy-forgery-inhibited pattern setting on the host side is given preference to in the embodiment 7, there may be used such a process that an image generated from the PDL and the host copy-forgery-inhibited pattern are stored in the hard disc drive, being separate from each other without being synthesized, and before the stored image is printed, the image generated from the PDL is synthesized to the printer copy-forgery-inhibited pattern while the host copy-forgery-inhibited pattern is excluded, in the case of contention between the printer copy-forgery-inhibited pattern and the host copy-forgery-inhibited pattern, and may be then printed.

Further, although the copy-forgery-inhibited pattern setting on the host side is given preference to in the seventh embodiment, there may be used such a process that an image generated from the PDL and a host copy-forgery-inhibited pattern are stored in the hard disc drive, being separate from each other without being synthesized, then the selection is made by the user as to whether the host copy-forgery-inhibited pattern is given preference to or the printer copy-forgery-inhibited pattern is given preference to before the stored imaged is printed in the case of contention between the host copy-forgery-inhibited pattern and the printer copy-forgery-inhibited pattern, and the image generated from the PDL is synthesized to the selected copy-forgery-inhibited pattern, and is thereafter printed.

Further, although the copy-forgery-inhibited pattern setting on the host side is given preference to in the seventh embodiment, if it is determined that the stored copy-forgery-inhibited pattern contends with the printer copy-forgery-inhibited pattern before the image including the stored copy-forgery-inhibited pattern is to be printed, this printing may be interrupted.

Another Embodiment

Although explanation has been hereinabove made of the above-mentioned embodiments in which the information of a copy-forgery-inhibited pattern image is set in the printer by the user or the supervisor thereof through the intermediary of the UI, the embodiments of the present invention should not be limited to this application alone. For example, the embodiments of the present invention may be also applied to such a configuration that the information of a copy-forgery-inhibited pattern image has been previously set in the printer, that is, for example, the information of a copy-forgery-inhibited pattern image included in the PDL data from the host unit is compared with the information of a fixed copy-forgery-inhibited pattern image having been previously set in the printer at step S6107 in the flowchart shown in FIG. 20.

Further Another Embodiment

Further, in yet another embodiment, a process may be configured such that if a copy-forgery-inhibited pattern is set by a forced copy-forgery-inhibited pattern mode on the printer side, the process stated in the second embodiment is selected so as to print the copy-forgery-inhibited pattern set in the printer image, preference to a copy-forgery-inhibited pattern set in the host side, and if a copy-forgery-inhibited pattern is set by a normal copy-forgery-inhibited pattern mode on the printer side, the process stated in the fifth or sixth embodiment is selected so as to print the copy-forgery-inhibited pattern set on the host preferential to the copy-forgery-inhibited pattern set on the printer side.

Further Another Embodiment

It is noted that the embodiments of the present invention can be implemented by a record medium recorded thereon with program codes which may effect process steps in the flowcharts shown in FIGS. 20, and 23 to 25 as explained in the above-mentioned embodiments, that is, the program codes stored in the recording medium is read by a computer in a system or an apparatus so as to carry out the programs.

In this case, the program codes themselves read from the recording medium execute the functions in the embodiments as stated above, and accordingly, it is noted that the recording medium stored therein the program codes may constitute embodiments of the present invention.

As to the recording medium for supplying the program codes, there may be used, for example a floppy disc, a hard disc, an optical disc, a magneto-optic disc, a CD-ROM, a CD-R, a magnetic tape, a nonvolatile memory card, a ROM or the like.

Further, in addition to the above-mentioned configuration in which the above-mentioned embodiments are implemented by executing program codes read out by a computer, embodiments of the present invention may also include such a configuration that the OS (the operation program) running on the computer executes a part or all of actual processes under the instructions of the program codes, and the functions in the above-mentioned embodiments are implemented by these processes.

Further, embodiments of the present invention may includes such a case that after the program code read from the recording medium, is retrieved in a memory incorporated in a function enhancement board inserted in a computer or a function enhancement unit connected to a computer, a CPU incorporated in the function enhancement board or in the function enhancement unit executes a part or all of actual process under the instructions of the program codes in order to effect the functions in the above-mentioned embodiments by the processes.

In view of the above-mentioned embodiments of the present invention, a copy-forgery-inhibited pattern image may be appropriately printed even though copy-forgery-inhibited patterns are set in both host unit and printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-167406, filed Jun. 7, 2005 and Japanese Patent Application No. 2006-099817, filed Mar. 31, 2006, which are hereby incorporated by reference herein in its entirety.

What is claimed is:

1. A printer comprising:
a synthesizing unit configured to synthesize a copy-forgery-inhibited pattern set in a host unit to an image based on printing data received from the host unit if the copy-forgery-inhibited pattern is set in the host unit, the synthesizing unit configured to synthesize a copy-forgery-inhibited pattern set in the printer to an image based on printing data received from the host unit if the copy-forgery-inhibited pattern is set in the printer, and the synthesizing unit configured to allow a user to select either a copy-forgery-inhibited pattern set in the host unit or a copy-forgery-inhibited pattern set in the printer and to synthesize the selected copy-forgery-inhibited pattern to an image based on printing data received from the host unit if the copy-forgery-inhibited patterns are set respectively in both host unit and printer; and
a printing unit configured to print the image synthesized by the synthesizing unit.

2. A method comprising:
synthesizing a copy-forgery-inhibited pattern set in a host unit to an image based on printing data received from the host unit if the copy-forgery-inhibited pattern is set in the host unit;
synthesizing a copy-forgery-inhibited pattern set in a printer to an image based on printing data received from a host unit if the copy-forgery-inhibited pattern is set in the printer;
determining if copy-forgery-inhibited patterns are set in both the host unit and the printer; and
printing the synthesized image.

3. The method according to claim 2, further comprising:
rendering an operator to select either the copy-forgery-inhibited pattern set in the host unit or the copy-forgery-inhibited pattern set in the printer if the copy-forgery-inhibited patterns are set respectively in both the host unit and the printer; and
synthesizing the selected copy-forgery-inhibited pattern to an image based on printing data received from the host unit.

* * * * *